(12) United States Patent
Tomita

(10) Patent No.: US 7,164,853 B2
(45) Date of Patent: *Jan. 16, 2007

(54) VIBRATION DETECTION DEVICE AND VIBRATION CORRECTING OPTICAL DEVICE

(75) Inventor: Hiroyuki Tomita, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/809,413

(22) Filed: Mar. 26, 2004

(65) Prior Publication Data

US 2004/0190886 A1 Sep. 30, 2004

Related U.S. Application Data

(63) Continuation of application No. 10/347,689, filed on Jan. 22, 2003, now Pat. No. 6,778,766.

(30) Foreign Application Priority Data

| Jan. 25, 2002 | (JP) | ............................. 2002-016971 |
| Feb. 18, 2002 | (JP) | ............................. 2002-040223 |

(51) Int. Cl.
G03B 17/00 (2006.01)
(52) U.S. Cl. .................................................. 396/55
(58) Field of Classification Search ............ 396/52–55
See application file for complete search history.

(56) References Cited

U.S. PATENT DOCUMENTS

| 6,035,134 | A | * | 3/2000 | Sato et al. .................... 396/55 |
| 6,097,895 | A | * | 8/2000 | Furuyama .................... 396/55 |
| 6,208,810 | B1 | | 3/2001 | Imada |
| 6,263,161 | B1 | * | 7/2001 | Washisu ...................... 396/50 |
| 6,278,842 | B1 | * | 8/2001 | Yamazaki et al. ............ 396/55 |
| 6,393,215 | B1 | | 5/2002 | Washisu |
| 6,687,458 | B1 | * | 2/2004 | Masuda ....................... 396/55 |
| 6,778,766 | B1 | * | 8/2004 | Tomita ........................ 396/55 |
| 2002/0015587 | A1 | * | 2/2002 | Ohishi et al. ................. 396/55 |

FOREIGN PATENT DOCUMENTS

| JP | 05-142614 | 6/1993 |
| JP | 07-261234 | 10/1995 |
| JP | 10-213832 | 8/1998 |
| JP | 2000-039640 | 2/2000 |

* cited by examiner

*Primary Examiner*—Christopher Mahoney
(74) *Attorney, Agent, or Firm*—Oliff & Berridge PLC

(57) ABSTRACT

A vibration correcting optical device includes: a vibration detection unit that detects a vibration of the vibration correcting optical device and outputs a vibration detection signal corresponding to the vibration; a vibration state judgment unit that judges a state of the vibration of the vibration correcting optical device to be one of at least three states, based upon the vibration detection signal; an image vibration correcting optical system that corrects an image vibration caused by the vibration of the vibration correcting optical device; a drive unit that drives the image vibration correcting optical system based upon a drive signal; a drive signal arithmetic operation unit that calculates the drive signal based upon the vibration detection signal and outputs the drive signal to the drive unit; and a drive signal calculation control unit that controls a method for calculating the drive signal adopted at the drive signal arithmetic operation unit in conformance to the state of the vibration ascertained through a judgment executed by the vibration state judgment unit.

13 Claims, 12 Drawing Sheets

FIG.6

| | | DETECTION RESULTS AT ABNORMAL VIBRATION DETECTION UNIT | | |
|---|---|---|---|---|
| | | NORMAL VIBRATION | ABNORMAL VIBRATION | |
| | | | (TYPE 1) RELATIVELY GENTLE PANNING USED ABOARD A VEHICLE | (TYPE 2) SWIFT PANNING |
| | | REFERENCE VALUE FOR NORMAL VIBRATION | REFERENCE VALUE FOR ABNORMAL VIBRATION | |
| MODE SWITCH:MODE 1 NORMAL OPERATION, ETC. (STEADY FOOTING) | FULLY PRESSED (SW2:ON) | VIBRATION DETECTION SIGNAL NOT ALTERED (VIBRATION CORRECTION EXECUTED) | VIBRATION DETECTION SIGNAL NOT ALTERED (VIBRATION CORRECTION EXECUTED) | SET VIBRATION DETECTION SIGNAL TO 0 (VIBRATION CORRECTION STOPPED) |
| | HALFWAY PRESSED (SW2:OFF) | | SET VIBRATION DETECTION SIGNAL TO 0 (VIBRATION CORRECTION STOPPED) | SET VIBRATION DETECTION SIGNAL TO 0 (VIBRATION CORRECTION STOPPED) |
| MODE SWITCH:MODE 2 ABOARD A VEHICLE (UNSTEADY FOOTING) | FULLY PRESSED (SW2:ON) | VIBRATION DETECTION SIGNAL NOT ALTERED (VIBRATION CORRECTION EXECUTED) | | |
| | HALFWAY PRESSED (SW2:OFF) | | | |

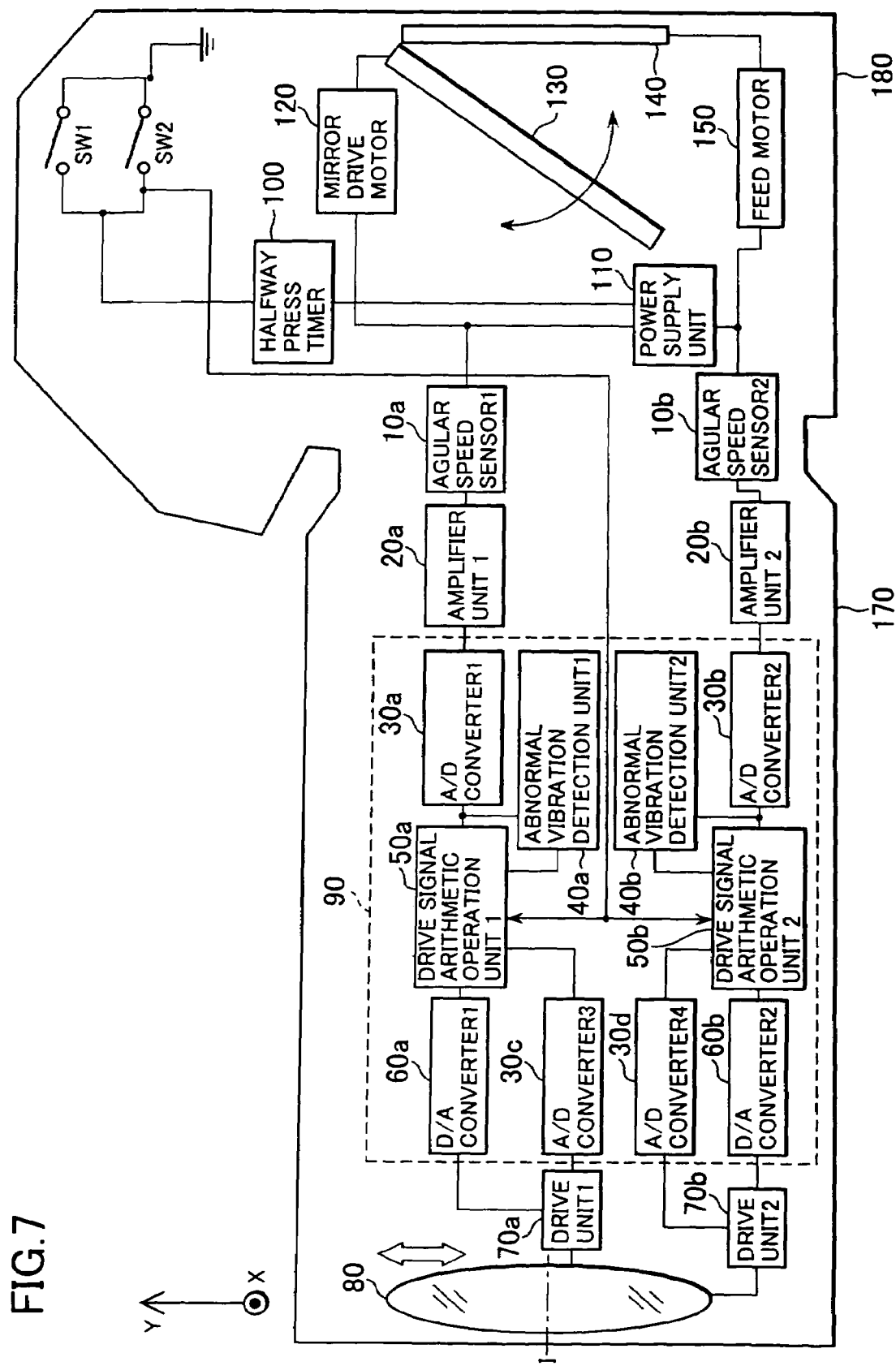

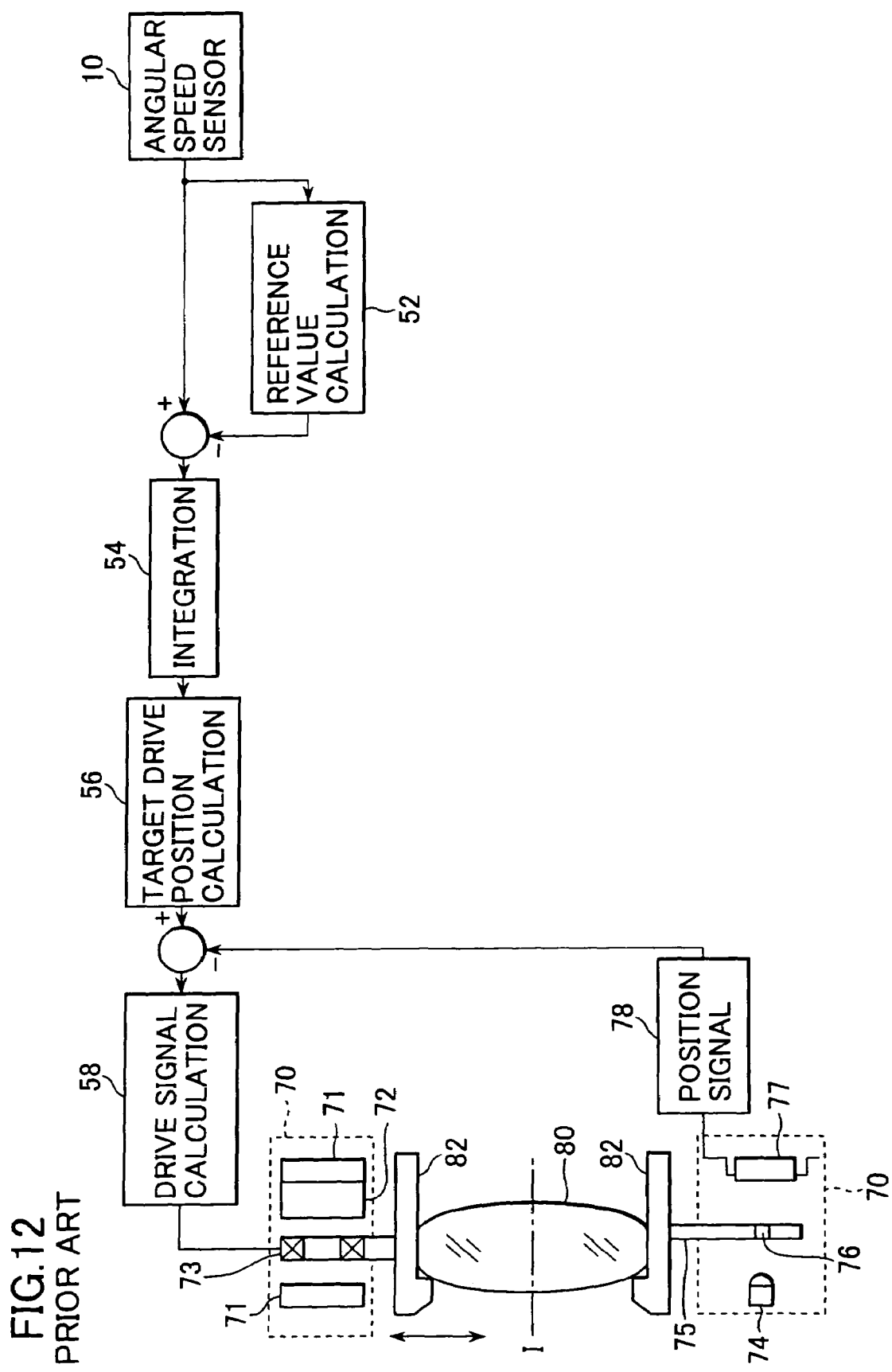

VIBRATION DETECTION DEVICE AND VIBRATION CORRECTING OPTICAL DEVICE

This is a Continuation of Application Ser. No. 10/347,689 filed Jan. 22, 2003 now U.S. Pat. No. 6,778,766. The entire disclosure of the prior application is hereby incorporated by reference herein in its entirety.

INCORPORATION BY REFERENCE

The disclosures of the following priority applications and Laid-open patent publications are herein incorporated by reference:
Japanese Patent Application No. 2002-016971 filed Jan. 25, 2002
Japanese Patent Application No. 2002-040223, filed Feb. 18, 2002
Japanese Laid-open Patent Publication No. H 05-142614
Japanese Laid-open Patent Publication No. H 07-261234
Japanese Laid-open Patent Publication No. H 10-213832
Japanese Laid-open Patent Publication No. 2000-039640

BACKGROUND OF THE INVENTION

1. Field of the Invention

The present invention relates to a vibration detection device that detects a vibration caused by a hand movement or the like and a vibration correcting optical device internally provided with a vibration detection device.

2. Description of the Related Art

A primary cause of vibrations to which optical devices such as binoculars and photographing apparatuses such as cameras are subjected is unsteady handling by the user. As a means for correcting an image vibration or an image blur caused by such hand movement, vibration correcting optical devices have been proposed in the related art.

The following is an explanation of the operation of a vibration correcting optical device in the related art, given in reference to FIG. 12.

FIG. 12 is a block diagram showing the basic structure adopted in a vibration correcting optical device which includes a vibration detection device.

An angular speed sensor 10, which detects a vibration applied to the vibration correcting optical device, is generally constituted of a piezoelectric vibration-type angular speed sensor capable of detecting coriolis force. An output from the angular speed sensor 10 is transmitted to a reference value calculation unit 52. The reference value calculation unit 52 is a component that calculates a vibration reference value based upon the output from the angular speed sensor 10. After the reference value is subtracted from the vibration signal output by the angular speed sensor 10, the vibration signal is transmitted to an integrating operation unit 54. The integrating operation unit 54 is a component that converts the vibration signal expressed in angular speed units to a vibration angle for the vibration correcting optical device through a time integration executed on the vibration signal.

A target drive position calculation unit 56 calculates target drive position information for a blur correcting lens 80 by incorporating information such as the lens focal length with the information indicating the vibration angle obtained by the integrating operation unit 54. A drive signal arithmetic operations unit 58 calculates the difference between the target drive position information and position information indicating the current position of the blur correcting lens 80 and supplies a drive current to a coil 73 so as to drive the blur correcting lens 80 in conformance to the target drive position information.

A drive unit 70 that drives the blur correcting lens 80 includes an actuator portion that generates a drive force and a position detection sensor portion that detects the position of the blur correcting lens 80.

The actuator portion of the drive unit 70 is constituted of a yoke 71, a magnet 72 and the coil 73. The coil 73 is provided within a magnetic circuit formed by the yoke 71 and the magnet 72, and as a current is supplied to the coil 73, a force is generated at the coil 73 in accordance with Fleming's left-hand rule. The coil 73 is mounted at a lens barrel 82 housing the blur correcting lens 80. Since the blur correcting lens 80 and the lens barrel 82 are adapted to move along a direction perpendicular to an optical axis I, the blur correcting lens 80 can be driven along the direction perpendicular to the optical axis I by moving the coil 73.

The position detection sensor portion of the drive unit 70, which monitors the movement of the blur correcting lens 80, includes an infrared light emitting diode (hereafter referred to as an IRED) 74, a slit plate 76 having a slit 76a and a PSD (position sensitive device) 77.

Light emitted by the IRED 74 first passes through the slit 76a where the width of the light beam is constricted, and then reaches the PSD 77. The PSD 77 outputs a signal corresponding to the position of the light received on its light receiving surface. Since the slit plate 76 is mounted at the lens barrel 82, the movement of the blur correcting lens 80 is translated to movement of the slit 76a, which, in turn, is translated to movement of the light on the light receiving surface of the PSD 77. Thus, the position of the light received on to the light receiving surface of the PSD 77 is equivalent to the position of the blur correcting lens 80. A signal output by the PSD 77 is fed back as a position signal 78.

This type of vibration correcting optical device is effective for correcting an image blur attributable to an inadvertent hand movement of the user during, for instance, a normal photographing operation performed by the user holding the camera still. However, the camera may not always be used in a stationary state. For instance, the camera may be used by a photographer who often takes pictures by panning the camera or the camera may often be used by a photographer aboard a vehicle such as a helicopter. In addition, during a photographing operation performed with an AF camera, the composition is often modified due to AF lock after the photographic focus is set on a primary subject with the AF function. Since a camera is used in a variety of operating conditions, as described above, a vibration correcting system that can be effectively used under the varying circumstances is much needed.

The following are the requirements for a vibration correcting optical device used under various conditions.

(requirement 1) Under any circumstances, the quality of the image resulting from a photographing operation (the image quality of the picture) is superior to the quality of an image with no vibration correction.

(requirement 2) The user observing a viewfinder image does not experience any discomfort. Namely, during a photographing operation performed by holding the camera in a stationary state or performed from a vehicle, the photographer is able to verify that the vibration correction is in effect (the image appears still), whereas the photographer is able to follow the subject with ease during a panning photographing operation.

In order to meet these requirements, Japanese Laid-open Patent Publication No. H 05-142614, Japanese Laid-open Patent Publication No. H 07-261234, Japanese Laid-open Patent Publication No. H 10-213832 and Japanese Laid-open Patent Publication No. 2000-039640, for instance, propose methods for distinguishing an intended movement from an inadvertent vibration and for classifying movements into specific types (the photographer is holding the camera in the normal manner, the photographer is panning the camera, the photographer is taking pictures from a vehicle, etc.).

However, these vibration correcting optical devices in the related art do not always operate as intended by the photographer. For instance, a relatively large vibration occurring while the photographer is aboard a vehicle sometimes causes an erroneous judgment that the photographer is performing a panning photographing operation.

There is a vibration correcting optical device that allows the photographer to switch vibration correction modes through a switch operation so as to ensure that the vibration correcting optical device is always able to operate as intended by the photographer under various conditions. In this vibration correcting optical device, a different switch position is selected depending upon whether or not the camera is used for a panning photographing operation, and an automatic detection of a panning photographing operation is disallowed if the camera is not used for a panning photographing operation. However, the following problems arise when a vibration correcting optical device assumes such switch settings.

Even when the photographer is performing a normal photographing operation, he may handle the camera as in a panning photographing operation in order to search for the right composition (in order to modify the composition). However, since the switch setting at which a panning photographing operation is automatically detected is not selected for a normal photographing operation, a change in the composition results in an unnatural movement of the image and the image does not stabilize immediately after the composition is selected.

In addition, the result of the photographing operation is adversely affected (the image is blurred) in the worst-case scenario.

If the camera is operated by selecting a switch setting while the composition is being modified and selecting another switch setting after the composition has been decided upon in order to address this problem, the camera operation becomes impracticably complicated.

It is also required of a blur correcting optical system that it be capable of efficiently distinguishing a movement intended by the user, an unintentional vibration and a state in which both intended movements and unintended vibrations occur together.

SUMMARY OF THE INVENTION

The present invention, therefore, provides a vibration detection device that is capable of detecting vibrations accurately and efficiently and a vibration correcting optical device that is capable of correcting a vibration as appropriate.

The vibration correcting optical device according to the present invention comprises a vibration detection unit that detects a vibration of the vibration correcting optical device and outputs a vibration detection signal corresponding to the vibration; a vibration state judgment unit that judges a state of the vibration of the vibration correcting optical device to be one of at least three states, based upon the vibration detection signal; an image vibration correcting optical system that corrects an image vibration caused by the vibration of the vibration correcting optical device; a drive unit that drives the image vibration correcting optical system based upon a drive signal; a drive signal arithmetic operation unit that calculates the drive signal based upon the vibration detection signal and outputs the drive signal to the drive unit; and a drive signal calculation control unit that controls a method for calculating the drive signal adopted at the drive signal arithmetic operation unit in conformance to the state of the vibration ascertained through a judgment executed by the vibration state judgment unit.

In the vibration correcting optical device, it is preferred that the device further comprises a reference value calculation unit that obtains through an arithmetic operation a reference value to be used as a reference in processing the vibration detection signal based upon the vibration detection signal, wherein the vibration state judgment unit judges the state of the vibration of the vibration correcting optical device based upon the vibration detection signal and the reference value; and the drive signal arithmetic operation unit calculates the drive signal based upon the vibration detection signal and the reference value.

It is preferred that the vibration state judgment unit judges the state of the vibration to be one of three states, i.e., a normal vibration state, a first abnormal vibration state and a second abnormal vibration state. In this connection, it is preferred that the vibration state judgment unit judges the state of the vibration to be the normal vibration state if the vibration contains a vibration which is not accompanied by a movement of the vibration correcting optical device, judges the state of the vibration to be the first abnormal vibration state if the vibration contains a vibration accompanied by a movement of the vibration correcting optical device and a vibration with a frequency equal to or exceeding a predetermined value and judges the state of the vibration to be the second abnormal vibration state if the vibration contains a vibration accompanied by a movement of the vibration correcting optical device and a vibration with a frequency lower than the predetermined value. Alternatively, it is preferred that the vibration state judgment unit judges the state of the vibration to be the normal vibration state if the vibration is predominantly constituted of a vibration not intended by the photographer, judges the state of the vibration to be the first abnormal vibration state if the vibration is constituted of both a movement intended by the photographer and an unintended vibration and judges the state of the vibration to be the second abnormal vibration state if the vibration is predominantly constituted of a movement intended by the photographer. Further alternatively, it is preferred that the device further comprises a mode switch that can be operated to switch a control state of the drive signal calculation control unit, wherein: the drive signal calculation control unit implements control on the drive signal arithmetic operation unit so that the drive signal, which enables the vibration correcting optical system to correct image vibration, is calculated by the drive signal arithmetic operation unit regardless of a setting selected at the mode switch or whether or not a photographing exposure operation is in progress, if the vibration state judgment unit judges the state of the vibration to be the normal vibration state.

It is preferred that the vibration correcting optical device further comprises a mode switch that can be operated to switch to a state of control implemented by the drive signal calculation control unit, wherein: the drive signal calculation control unit implements control for adjusting the method for calculating the drive signal in conformance to a setting selected at the mode switch. In this connection, it is preferred that at the mode switch, a first mode, in which the control implemented by the drive signal calculation control unit is automatically switched in conformance to the state ascertained through the judgment executed by the vibration state judgment unit and a second mode, in which the drive signal calculation control unit is controlled so as to enable the vibration correcting optical system to correct image vibration regardless of the state ascertained through the judgment executed by a vibration state judgment unit or whether or not a photographing exposure operation is in progress, can be selected. It is further preferred that the vibration state judgment unit judges the state of a vibration to be one of three states, i.e., a normal vibration state, a first abnormal vibration state and a second abnormal vibration state; and the drive signal calculation control unit controls the method for calculating the drive signal adopted at the drive signal arithmetic operation unit so as not to correct image vibration during a photographic exposure preparation but to correct image vibration during a photographing exposure operation, if the vibration state judgment unit judges the state of the vibration to be the first abnormal vibration state and the first mode is selected at the mode switch. Alternatively, it is preferred that the vibration state judgment unit judges the state of a vibration to be one of three states, i.e., a normal vibration state, a first abnormal vibration state and a second abnormal vibration state; and the drive signal calculation control unit controls the method for calculating the drive signal adopted at the drive signal arithmetic operation unit so as to disallow image vibration correction by stopping drive of the vibration correcting optical system regardless of whether or not a photographing exposure operation is in progress, if the vibration state judgment unit judges the state of the vibration to be the second abnormal vibration state and the first mode is selected at the mode switch.

It is preferred that the drive signal calculation control unit implements control so as to switch the method for calculating the drive signal adopted at the drive signal arithmetic operation unit in conformance to whether or not a photographing exposure operation is in progress.

A vibration detection device according to the present invention comprises a vibration detection unit that detects a vibration of a vibration detection target device mounted with the vibration detection device and outputs a vibration detection signal in correspondence to the vibration; a reference value calculation unit that obtains through an arithmetic operation a reference value to be used as a reference in processing the vibration detection signal based upon the vibration detection signal; a movement start detection unit that detects a start of a movement of the vibration detection target device by comparing the vibration detection signal with the reference value; a movement end detection unit that detects an end of the movement of the vibration detection target device by comparing the vibration detection signal with the reference value; and a movement state judgment unit that judges a state of the movement of the vibration detection target device during a period elapsing between the start and the end of the movement of the vibration detection target device and outputs results of the judgment on the movement state. The movement state judgment unit judges the movement state by using the vibration detection signal and the reference value if the vibration detection signal and the reference value satisfy a predetermined condition, and judges the movement state without using the vibration detection signal or the reference value if the vibration detection signal and the reference value do not satisfy the predetermined condition.

In the vibration detection device, it is preferred that the movement state judgment unit holds current judgment results without depending upon the vibration detection signal or the reference value if the vibration detection signal and the reference value do not satisfy the predetermined conditions.

It is preferred that the movement state judgment unit calculates a value representing a difference between the vibration detection signal and the reference value; assigns the predetermined condition in relation to the difference value by mandating that the difference value be within a predetermined range; judges the movement state by using the vibration detection signal and the reference value if the difference value is outside the predetermined range; and judges the movement state without using the vibration detection signal or the reference value if the difference value is within the predetermined range. In this connection, it is preferred that when the vibration detection signal and the reference value are expressed in units of degrees/sec, the predetermined range is ± (0.4 through 0.6) degrees/sec.

It is preferred that the movement state judgment unit judges the state of the movement of the vibration detection target device to be a first movement state which contains a vibration not intended by a user using the vibration detection target device to a predetermined extent or more, or a second movement state which contains a movement intended by the user to a predetermined extent or more, and outputs either the first movement state or the second movement state as movement state judgment results. In this connection, it is preferred that the movement state judgment unit monitors a sign attached to a value representing a difference between the vibration detection signal and the reference value when judging the movement state by using the vibration detection signal and the reference value and sets the movement state judgment results to the second movement state if the sign remains unchanged over a predetermined length of time or longer. Further, it is preferred that the predetermined length of time is ⅕ through ⅓ sec. Alternatively, it is preferred that the movement state judgment unit monitors a sign attached to a value representing a difference between the vibration detection signal and the reference value when judging the movement state by using the vibration detection signal and the reference value and sets the movement state judgment results to the first movement state if the sign changes a predetermined number of times or more. It is further preferred that the movement state judgment unit initializes the movement state judgment results if the movement start detection unit detects a movement start so that the movement state judgment results are initialized to the first movement state if an absolute value of a difference between the vibration detection signal and the reference value is smaller than a predetermined value and the movement state judgment results are initialized to the second movement state if the absolute value of the difference is greater than the predetermined value.

It is further preferred that the movement state judgment unit initializes the movement state judgment results if the movement start detection unit detects a movement start.

Another vibration correcting optical device according to the present invention comprises: a vibration detection device according to claim 12; an image vibration correcting optical system that corrects image vibration caused by a vibration of the vibration correcting optical device constituting the vibration detection target device; a drive unit that drives the image vibration correcting optical system; a drive signal arithmetic operation unit that calculates a drive signal based upon the vibration detection signal and the reference value and outputs the drive signal; and a drive signal calculation control unit that controls a method of an arithmetic operation adopted at the drive signal arithmetic operation unit in conformance to results of a detection executed by the movement start detection unit, results of a detection executed by the movement end detection unit and the movement state judgment results obtained at the movement state judgment unit.

BRIEF DESCRIPTION OF THE DRAWINGS

FIG. 4 presents a flowchart of the drive signal calculation 1 executed when the halfway press switch is turned on;

FIG. 5 presents a flowchart of the drive signal calculation 2 executed when the full press switch is turned on;

FIG. 6 presents a table summarizing the drive signal calculation 1 and the drive signal calculation 2 executed in specific manners through the operations shown in FIGS. 4 and 5;

FIG. 7 is a block diagram schematically illustrating the vibration detection device and the vibration correcting optical device according to a second embodiment of the present invention;

FIG. 12 is a block diagram of the basic structure assumed in a vibration correcting optical device having a vibration detection device in the related art.

DESCRIPTION OF THE PREFERRED EMBODIMENTS

-First Embodiment-

Figure 1:
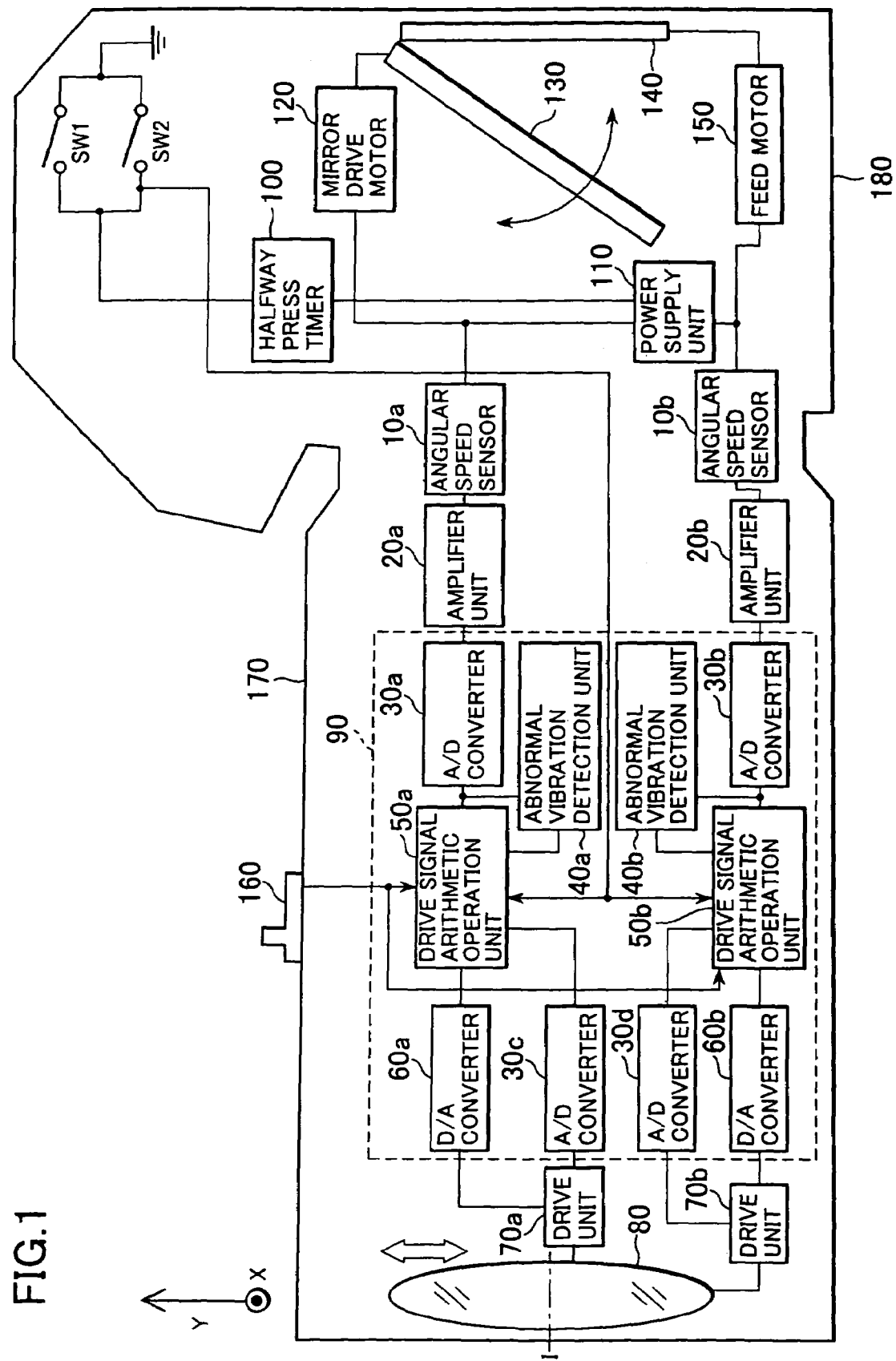
FIG. 1 is a block diagram schematically illustrating the vibration detection device and the vibration correcting optical device according to a first embodiment of the present invention.

The following is an explanation of the first embodiment of the present invention, given in reference to the drawings. FIG. 1 is a block diagram schematically illustrating the vibration detection device and the vibration correcting optical device (optical apparatus) according to the first embodiment of the present invention. In this embodiment, the present invention is adopted in a vibration correcting camera which uses silver halide film.

(Outline of a Vibration Correcting Camera)

A halfway press switch SW 1 enters an on state by interlocking with a halfway press operation of a shutter release button (not shown). As this halfway press switch SW 1 is turned on, a series of photographic preparatory operations including a photometric calculation executed by a photometering unit (not shown) and autofocus drive by an autofocus drive unit (not shown) is started. In addition, if a halfway press timer 100 has been in an off state, the halfway press timer 100 enters an on state as the halfway press switch SW 1 is turned on.

A full press switch SW2 enters an on state by interlocking with a full press operation of the shutter release button (not shown) performed to press the shutter release button further down. As this switch is turned on, a series of photographing operations including a mirror-up operation of a mirror 130, a shutter open/close operation executed by a shutter mechanism (not shown), a mirror-down operation of the mirror 130, a film windup operation executed by a feed motor 150 to wind up film 140 is performed.

The halfway press timer 100 enters an on state as the halfway press switch SW 1 is turned on, remains in an on state while the halfway press switch SW 1 sustains an on state and still remains in an on state over a predetermined length of time even after the halfway press a switch SW 1 is turned off. The halfway press timer 100 starts a count operation as it is turned on and continues the count operation as long as it remains in an on state.

A power supply unit 110, which supplies power to various components of the camera, continuously supplies power to the components within the camera system which require power such as an angular speed sensor 10 while the halfway press timer 100 of the camera is in an on state. In addition, when the halfway press timer 100 is turned off, the power supply unit 110 stops the power supply to the angular speed sensor 10 and the like. As a result, a vibration detection in the camera executed by the angular speed sensor 10 is enabled only while the halfway press timer 100 is in an on state in the camera.

Angular speed sensors 10a and 10b (they may be representatively referred to as angular speed sensor 10) are each a vibration detection unit that detects a vibration applied to the camera as an angular speed value. The vibration detection unit detects angular speed by using the coriolis force applied to the angular speed sensor 10 and outputs the detection results as a voltage signal. The angular speed sensor 10a detects an angular displacement manifesting along the X axis in the figure, whereas the angular speed sensor 10b detects the angular displacement manifesting along the Y axis in the figure. By providing the angular speed sensors 10a and 10b along the axes extending in different directions, a vibration of the camera can be two-dimensionally detected.

The voltage signals output by the angular speed sensors 10 are transmitted to amplifier units 20. It is to be noted that the angular speed sensors 10 are able to detect the angular speeds only while power is supplied thereto by the power supply unit 110.

Amplifier units 20a and 20b (they may be representatively referred to as amplifier unit 20), each amplify output from the angular speed sensors 10. Since the level of the outputs from the angular speed sensors 10 is normally low, an accurate vibration detection cannot be achieved before digitizing the output at A/D converters 30a and 30b and processing the digitized outputs in a microcomputer 90 due to the low resolution of the angular speed values (too large angular speed value per bit), and thus, the accuracy of the vibration correction cannot be improved. Accordingly, the angular speed signals are amplified before they are input to the A/D converters 30a and 30b. In this manner, the resolution of the angular speed values in the microcomputer 90 can be raised (the angular speed values per bit can be lowered), and thus, the accuracy of the vibration correction can be enhanced.

Two amplifier units 20a and 20b, which may be representatively referred to as the amplifier unit 20, are provided in correspondence to the angular speed sensors 10a and 10b respectively. In addition, the amplifier units 20 may each include a low pass filter, so as to enable them to reduce the high frequency noise contained in the sensor output signal as well as amplifying the signal.

Vibration detection signals obtained by amplifying the angular speed signals at the amplifier units 20 are then transmitted to the A/D converters 30.

The A/D converters each convert an analog signal to a digital signal. In the embodiment, the A/D converters 30a and 30b and A/D converters 30c and 30d are provided. They may be referred to representatively as the A/D converters 30.

The A/D converters 30a and 30b each convert an analog vibration detection signals provided by the amplifier units 20 to digital signals. The digital signals obtained by digitizing the vibration detection signals can then be used in arithmetic processing executed within the microcomputer 90. The vibration detection signals resulting from the conversion are input to drive signal arithmetic operation units 50a and 50b and abnormal vibration detection units 40a and 40b.

The A/D converters 30c and 30d each convert blur correcting lens position information (an analog signal) provided by a drive unit 70 to a digital signal. The blur correcting lens position information resulting from the conversion is then transmitted to the drive signal arithmetic operation units 50a and 50b.

It is to be noted that while the embodiment is achieved on the assumption that the A/D converters 30 are internally provided in the microcomputer 90, the present invention is not limited to this example and A/D converters that are not part of the microcomputer 90 may be utilized instead.

In addition, while two A/D converters, i.e., the A/D converters 30a and 30b, are provided in correspondence to the amplifier units 20a and 20b respectively in the embodiment, a single A/D converter may be time-shared by the amplifier units to engage in alternate conversion operations. For instance, a single A/D converter may convert the signal provided by the amplifier unit 20b after converting the signal provided by the amplifier unit 20a, and subsequently, repeat conversion operations for converting the signal from the amplifier unit 20a, the signal from the amplifier unit 20b, the signal from the amplifier unit 20a and so forth. The same principle may also be applied to the A/D converters 30c and 30d.

The abnormal vibration detection units 40a and 40b (hereafter they may be representatively referred to as abnormal vibration detection units 40) each detect a state of camera vibration based upon the vibration detection signal transmitted from the A/D converter 30 and a reference value calculated at the drive signal arithmetic operation unit 50. A vibration state is classified as either a vibration occurring in a normal operation (in which no change or the like is made in the composition and the camera is not used in a vehicle or the like (hereafter referred to as a normal vibration state)) or a vibration occurring in a panning photographing operation or while the camera is used in a vehicle (a vibration that occurs as the apparatus is intentionally moved (hereafter referred an abnormal vibration state)), and the abnormal vibration detection units 40 detect which of the two states a vibration falls into. In addition, if an abnormal vibration state is detected, the abnormal vibration detection units classified the type of abnormal vibration as either type 1 (a first abnormal vibration state, a first moving state) or type 2 (a second abnormal vibration state, a second moving state). These classifications are summarized below.

(1) Normal Vibration State

A vibration is judged to indicate a normal vibration state if the vibration is entirely or predominantly attributable to a vibration not intended by the photographer. In this case, the photographer is assumed to be standing on unsteady footing.

(2) Abnormal Vibration State (Moving State)

(2-1) Type 1

A vibration is judged to indicate an abnormal vibration state, type 1, when the photographer is panning the camera relatively slowly, i.e., when the vibration is attributable to a vibration not intended by the photographer and a movement intended by the photographer. In addition, a vibration is judged to be type 1 if its amplitude is greater than normal due to unsteady footing even when the camera is operated in a vehicle, i.e., even when the vibration is entirely caused by a vibration not intended by the photographer.

(2-2) Type 2

A vibration is judged to indicate an abnormal vibration state, type 2, if it is predominantly attributable to a movement intended by the photographer as in a quick panning photographing operation.

The results of the detection executed by the abnormal vibration detection units 40 are transmitted to the drive signal arithmetic operation unit 50 which adjusts the calculation method in conformance to the detection results.

The drive signal arithmetic operation unit 50 generates through an arithmetic operation a drive signal to be used to drive the blur correcting lens (or the vibration correcting lens) 80 by using the vibration detection signals transmitted from the A/D converters 30 and the blur correcting lens position information and outputs the drive signal. It first calculates a vibration detection signal by calculating a reference value based upon the unprocessed vibration detection signal and subtracting the reference value from the unprocessed vibration detection signal value. Once the vibration detection signal is calculated, the drive signal arithmetic operation unit 50 modifies the vibration detection signal based upon the states of a mode switch 160, the full press switch SW2 and the detection results provided by the abnormal vibration detection unit 40. It is to be noted that the processing operation performed by the reference value arithmetic operation unit 50 to modify the vibration detection signal is to be detailed later.

By integrating the modified vibration detection signals, the angular speed signals are converted to angular displacement signals, and a target drive position of the blur correcting lens 80 is calculated by incorporating various conditions including the lens focal length with the angular displacement signal. Lastly, drive signals are generated through an arithmetic operation executed based upon the target drive position information and the position information indicating the position of the blur correcting lens 80 provided by the drive unit 70.

It is to be noted that although two drive signal arithmetic operation units 50a and 50b are provided in the embodiment, a single drive signal arithmetic operation unit may be utilized to execute drive signal calculation operations through time sharing. For instance, a single drive signal arithmetic operation unit may first calculate a drive signal along the X axis, then calculate a drive signal along the Y axis and, subsequently, calculate drive signals alternately along the X axis, the Y axis, the X axis, the Y axis and so forth.

The internal structure adopted in the drive signal arithmetic operation unit 50 is to be explained in detail later in reference to FIG. 2.

D/A converters 60a and 60b (hereafter they may be representatively referred to as D/A converters 60) each convert the drive signal (digital signal) obtained through the arithmetic operation executed at the drive signal arithmetic operation unit 50 to an analog signal. The analog signal resulting from the conversion is transmitted to the drive unit 70.

It is to be noted that while the embodiment is achieved on the assumption that the D/A converters 60 are internally provided in the microcomputer 90, the present invention is not limited to this example and D/A converters which are not part of the microcomputer 90 may be utilized instead.

In addition, while two D/A converters 60a and 60b are provided in the embodiment, a single D/A converter may be utilized to execute conversion operations through time share. For instance, a single D/A converter may first convert the signal along the X axis, then convert the signal along the Y axis and subsequently convert the signals alternately along the X axis, the Y axis, the X axis, the Y axis and so forth.

Drive units 70a and 70b (hereafter they may be representatively referred to as the drive units 70) drive the blur correcting lens 80 in conformance to the drive signals (analog signals) transmitted from the D/A converters 60. Each drive unit 70 includes an actuator for driving the blur correcting lens 80, a position detection sensor for detecting the position of the blur correcting lens 80 and the like. The output from the position detection sensor is transmitted to the drive signal arithmetic operation unit 50 via the A/D converter 30.

Since it is necessary to drive the blur correcting lens 80 two-dimensionally, two drive units, i.e., the drive unit 70a and the drive unit 70b, must be provided.

The blur correcting lens 80 constitutes part of an image forming optical system (not shown) internally provided at a lens barrel 170 of the photographing apparatus and is an image blur correcting optical system constituted of a single lens or a plurality of lenses capable of moving within a plane intersecting the optical axis I substantially perpendicular to the optical axis I. The blur correcting lens 80 is driven along a direction extending substantially perpendicular to the optical axis I by the drive units 70 to deflect the optical axis I of the image forming optical system.

An image such as a photograph becomes blurred when the image on the image forming plane (the surface of the film 140) moves during the exposure due to a vibration such as an unsteady hand movement to which the camera is subjected. However, in a vibration correcting camera such as that shown in FIG. 1, which is internally provided with vibration detection sensors such as the angular speed sensors 10, is capable of detecting a vibration to which the camera is subjected. Since the movement of the image on the image forming surface caused by a vibration can be ascertained once the vibration applied to the camera is detected, the blur correcting lens 80 can be moved to stop the movement of the image on the image forming plane and, as a result, the movement of the image on the image forming plane, i.e., the image blur, can be corrected.

The microcomputer 90 includes the A/D converters 30, the abnormal vibration detection units 40, the drive signal arithmetic operation units 50, the D/A converters 60 and the like built into it. In addition to the operation explained so far, the microcomputer 90 may implement control for autofocus drive and the like (not shown) as well.

A mirror drive motor 120 receives the power supplied by the power supply unit 110, and raises/lowers the mirror 130 as necessary. It is to be noted that while the mirror drive motor 120 is constituted of an electromagnetic actuator in the embodiment, the present invention is not limited to this example and it may adopt a mechanical means such as a spring.

The mirror 130 deflects the light from the image forming optical system (not shown) and sends off the deflected light to a pentaprism and the viewfinder (not shown). During an exposure operation, this mirror is raised and the light from the image forming optical system is allowed to reach the surface of the film 140.

The film 140 is used to record an image formed by the image forming optical system. It is to be noted that while the embodiment is achieved in conjunction with a silver halide camera, the present invention is not limited to this example and, it may instead be adopted in a camera which employs an area sensor such as a CMOS sensor or a CCD.

The feed motor 150 performs a frame feed for the film 140 when the exposure operation is completed. It is to be noted that the feed motor 150 itself is not required if an area sensor such as a CCD is employed as an image capturing medium instead of the film 140.

The mode switch 160 is operated by the photographer to select a vibration correcting operation mode in conformance to the purposes for which the camera is being utilized (the photographing state). In the embodiment, a mode 1 (a first mode) or a mode 2 (a second mode) can be selected. Conceivable purposes for which the camera may be used in correspondence to which the modes 1 and 2 are selected through the mode switch 160 are detailed below.

Mode 1: The camera is presumably used in a standard manner with which a picture is taken with the camera held essentially still or the composition is modified or a picture is taken by panning the camera, by the photographer on steady footing. Since the photographer is taking the picture on steady footing in a stationary state, i.e., the photographer is not aboard a vehicle or the like, the pictures are taken while no vibration other than that attributable to the movement made by the photographer, occurs.

Mode 2: The photographing operation is performed by the photographer riding in a vehicle, i.e., by the photographer on unsteady footing.

The details of the setting selected through the mode switch 160 are transmitted to the drive signal arithmetic operation unit 50.

A camera body 180 includes a photographing unit, and constitutes the camera main unit of a single lens reflex camera that allows the lens barrel 170 to be exchanged. It is to be noted that while the present invention is adopted in a single lens reflex camera in the embodiment, the present invention is not limited to this example and it may be adopted in a camera such as a compact camera that does not allow the use of interchangeable lenses.

Figure 2:
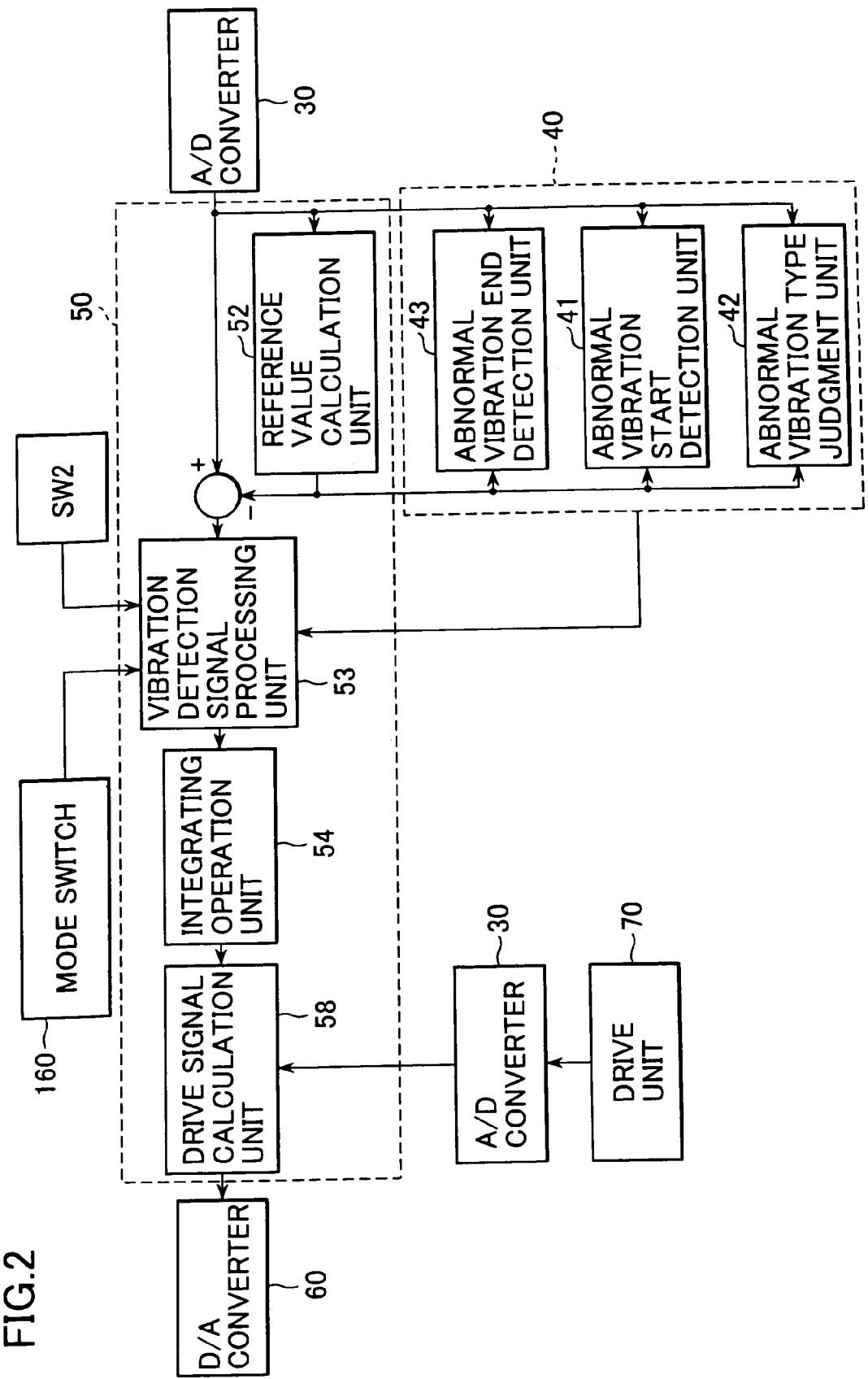
FIG. 2 shows the internal structures adopted in the drive signal calculation unit 50 and the abnormal vibration detection unit 40 in the first embodiment.

FIG. 2 shows the internal structures adopted in the drive signal arithmetic operation unit 50 and the abnormal vibration detection unit 40.

It is to be noted that since the details explained below apply to both the X direction and the Y direction, no specific reference is made to either direction to let the explanation cover both directions.

The drive signal arithmetic operation unit 50 includes a reference value calculation unit 52, a vibration detection signal processing unit 53, an integrating operation unit 54 and a drive signal calculation unit 58.

The reference value calculation unit 52 calculates a reference value to be used in the drive signal calculation by using the unprocessed vibration detection signal transmitted from an A/D converter 30 (30a or 30b).

Under normal circumstances, the reference value in a stationary state should be set to the value indicated by the output (hereafter referred to as the 0 output) obtained while the angular speed sensor 10 is in a completely stationary state. However, since this 0 output value is caused to fluctuate under varying environment conditions such as different degrees of drift or different temperatures, the accuracy of the vibration correction may be lowered or unnatural behavior may manifest if a fixed value is selected for the reference value.

Accordingly, it is desirable to ascertain the 0 output by calculating the reference value in an actual operating state, i.e., by using a signal indicating the extent of hand movement of the photographer. For this reason, the reference value calculation unit 52, which calculates the reference value by using the vibration detection signal, is included in the embodiment.

The reference value calculation unit 52 uses different arithmetic expressions for the normal vibration state and the abnormal vibration state to calculate the reference value. Examples of such arithmetic expressions are presented below.

Normal vibration state:

$$\omega_0(t) = \frac{1}{K0} \sum_{i=t-K0+1}^{t} \omega(i) \qquad \text{expression (1)}$$

Abnormal vibration state:

$$\omega_0(t) = \frac{1}{K1} \sum_{i=t-K1+1}^{t} \omega(i) \qquad \text{expression (2)}$$

with K0>K1

In the expressions given above, $\omega$ represents the vibration detection signal and $\omega 0$ represents the vibration reference value. In addition, the suffix t attached to these variables is a variable indicating the length of elapsing time, which takes an integral value representing the number of samplings in the embodiment. While both expressions indicate the moving average of the vibration detection signal, the number of sets of data used for averaging in the normal vibration state is different from that used in the abnormal vibration state.

It is desirable that the reference value in the normal vibration state be close to the 0 output value from the angular speed sensor. The frequency of the 0 output signal from angular speed sensor 10 is significantly lower than the frequency of a shaky hand movement of the photographer. For this reason, the reference value can be obtained by extracting the low frequency components in the vibration detection signal. Accordingly, the reference value of a shaky hand movement detection signal is calculated by calculating the moving average of the vibration detection signal, i.e., the moving average of the shaky hand movement. In addition, a large number of sets of data K0 is used to obtain the moving average in order to extract the low frequency components alone as exclusively as possible.

In the event of an abnormal vibration, the vibration detection signal fluctuates more than in a normal vibration. For instance, since the photographer moves the camera on purpose when he modifies the composition or takes a picture by panning the camera, the extent of the deflection is greater and the frequency is lower than in a normal vibration.

When the photographer is moving the camera on purpose in order to modify the composition or panning the camera to take a picture, it is not desirable to correct the intentional movement contained in the vibration manifesting at the camera. Accordingly, the number of sets of data K1 used to obtain the moving average in the abnormal vibration state is set lower than the number of sets of data K0 used in the normal vibration state. Since this makes it possible to obtain the reference value in response to the low frequency vibration detection signal faster, the composition can be set as intended by the photographer, and in addition, the unintended vibration alone can be corrected without executing low vibration correction on the vibration resulting from the intentional movement made by the photographer.

The reference value calculated at the reference value calculation unit 52 is used to be subtracted from the unprocessed vibration detection signal transmitted from the A/D converter 30 (30a or 30b) and also is transmitted to the abnormal vibration detection unit 40 to be used for an abnormal vibration detection.

It is to be noted that the reference value does not need to be calculated as the moving average as described above, and instead, the reference value may be calculated by using a low pass filter such as an FIR filter or an IIR filter. In the latter case, the cutoff frequency for the normal vibration state should be set lower than the cutoff frequency for the abnormal vibration state.

The vibration detection signal processing unit 53 processes (alters) the vibration detection signal obtained by subtracting the reference value from the unprocessed detection signal output from the angular speed sensor 10.

The following is an explanation of the processing executed to alter the vibration detection signal by the vibration detection signal processing unit 53 of the drive signal arithmetic operation unit 50.

(1) In the case where the abnormal vibration detection unit 40 judges that the vibration indicates the normal vibration state:

The vibration detection signal processing unit 53 does not alter the calculated vibration detection signal, regardless of the states of the mode switch 160 and the switch SW 2.

(2) In the case where the abnormal vibration detection unit 40 judges that the vibration indicates the abnormal vibration state:

(2-1) If the mode 1 is selected at the mode switch 160 and the full press switch SW 2 is in an off state when the abnormal vibration detection unit 40 judges that the vibration indicates the abnormal vibration state, the vibration detection signal processing unit 53 sets 0 for the vibration detection signal. Since the vibration correcting operation for the camera in a completely stationary state is executed if the vibration detection signal is at 0, the blur correcting lens 80 stops. As a result, no unnatural movement is allowed to manifest in the viewfinder image while the composition is being modified during a halfway press operation or while the camera is being panned to take a picture.

If the mode 1 is selected at the mode switch 160, the full press switch SW 2 is in an on state and the abnormal vibration is classified as type 1 when the abnormal vibration detection unit 40 judges that the vibration indicates the abnormal vibration state, the vibration detection signal is not altered. As a result, the blur correcting lens 80 is driven and a vibration correction is executed to correct only the signal component corresponding to the vibration not intended by the photographer.

Also, if the mode 1 is selected at the mode switch 160, the full press switch SW2 is in an on state and the abnormal vibration is classified as type 2 when the abnormal vibration detection unit 40 judges that the vibration indicates the abnormal vibration state, the vibration detection signal is set to 0 to disallow a correction of the movement intended by the photographer, so as to ensure that the photographing results are not compromised.

(2-2) If the mode 2 is selected at the mode switch 160 when the abnormal vibration detection unit 40 judges that the vibration indicates the abnormal vibration state, the vibration detection signal which has been calculated is used unaltered, regardless of the state of the mode switch 160 and the full press switch SW2. Since the mode 2 is selected by anticipating that the photographing operation is to be executed by the photographer in a vehicle and that the vibration detection signal will contain hardly any vibration attributable to an intentional movement made by the photographer as explained earlier, a vibration correction is executed in this case.

The integrating operation unit 54 is an arithmetic operation unit that converts the vibration detection signal (the angular speed) to vibration angle information through integration and calculates the target drive position for the blur correcting lens. An example of an arithmetic operation that may be executed by the integrating operation unit 54 is presented below.

$$\theta(t)=\theta(t-1)+C^*(\omega(t)-\omega_0(t)) \qquad \text{expression (3)}$$

In expression (3), $\theta(t)$ represents the target drive position, $\omega(t)$ represents the vibration detection signal, $\omega_0(t)$ represents the reference value and t represents the length of elapsing time (integral value), with C representing a constant determined in conformance to conditions such as the lens focal length.

The drive signal calculation unit 58 calculates a signal to drive the blur correcting lens 80 based upon the target drive position calculated at the integrating operation unit 54 and the position of the blur correcting lens 80 transmitted from the drive unit 70 via the A/D converter 30 (30c or 30d).

In general, in the arithmetic operation executed by the drive signal calculation unit 58, PID control is implemented through which the deviation of the position of the blur correcting lens relative to the target drive position is ascertained and the drive signal is calculated as the sum of the term which is in proportion to the deviation, the term which is in proportion to the integral of the deviation and the term which is in proportion to the differential of the deviation. It is to be noted, however, that the drive signal may be calculated through a method other than PID control.

The abnormal vibration detection unit 40 includes an abnormal vibration start detection unit 41, an abnormal vibration type judging unit 42 and an abnormal vibration end detection unit 43.

The abnormal vibration start detection unit 41 detects the start of an abnormal vibration. More specifically, the abnormal vibration start detection unit 41 detects an abnormal vibration start by using the unprocessed vibration detection signal output by the angular speed sensor which is transmitted via the A/D converter 30 and the reference value provided by the reference value calculation unit 52. It judges that an abnormal vibration has started at a time point at which the difference between the unprocessed detection signal and the reference value has exceeded a predetermined value, for instance. The abnormal vibration start detection unit 41 only engages in operation when the vibration indicates the normal vibration state and does not engage in any operation if the vibration indicates the abnormal vibration state In addition, the abnormal vibration start detection unit 41 transmits information indicating an abnormal vibration start to the reference value calculation unit 52 upon detecting the abnormal vibration start so as to allow the reference value calculation unit 52 to adjust the method of reference value calculation. In the embodiment, a switch is made so that the reference value is calculated by using expression (2) instead of expression (1). The abnormal vibration start detection unit 41 also transmits the abnormal vibration start information to the abnormal vibration type judging unit 42 and the vibration detection signal processing unit 53.

The abnormal vibration type judging unit 42 classifies a given abnormal vibration as type 1 (the first abnormal vibration state) or type 2 (the second abnormal vibration state). More specifically, it classifies the abnormal vibration as type 1 if the unprocessed vibration detection signal contains a high frequency component and classifies the abnormal vibration as type 2 if the unprocessed vibration detection signal only contains the low frequency component. A type 1 abnormal vibration is constituted of a movement intended by the photographer and a vibration not intended by the photographer, whereas a type 2 abnormal vibration is exclusively constituted of a movement intended by the photographer or is predominantly constituted of a movement intended by the photographer. The abnormal vibration type judging unit 42 is allowed to engage in operation until an abnormal vibration end is detected following a detection of an abnormal vibration start, and is not engaged in operation in the case of a normal vibration.

The results of the abnormal vibration classification executed by the abnormal vibration type judging unit 42 are transmitted to the vibration detection signal processing unit 53.

The abnormal vibration end detection unit 43 detects an abnormal vibration end by using the unprocessed vibration detection signal output by the angular speed sensor 10, which is transmitted via the A/D converter 30, and the reference value providing by the reference value calculation unit 52. For instance it judges that the abnormal vibration has ended when the difference between the unprocessed detection signal and the reference value has remained equal to or smaller than the predetermined value over a predetermined length of time. The abnormal vibration end detection unit 43 engages in operation in the abnormal vibration state and does not engage in operation in the normal vibration state.

In addition, the abnormal vibration end detection unit 43 transmits information indicating an abnormal vibration end to the reference value calculation unit 52 upon detecting the abnormal vibration end so as to allow the reference value calculation unit 52 to adjust the method of reference value calculation. In the embodiment, a switch is made so that the reference value is calculated by using expression (1) instead of expression (2). The abnormal vibration end detection unit 43 also transmits the abnormal vibration end information to the abnormal vibration type judging unit 42 and the vibration detection signal processing unit 53.

(Operation of Vibration Correcting Camera)

Next, the operation of the vibration correcting camera achieved in the embodiment is explained.

Figure 3:
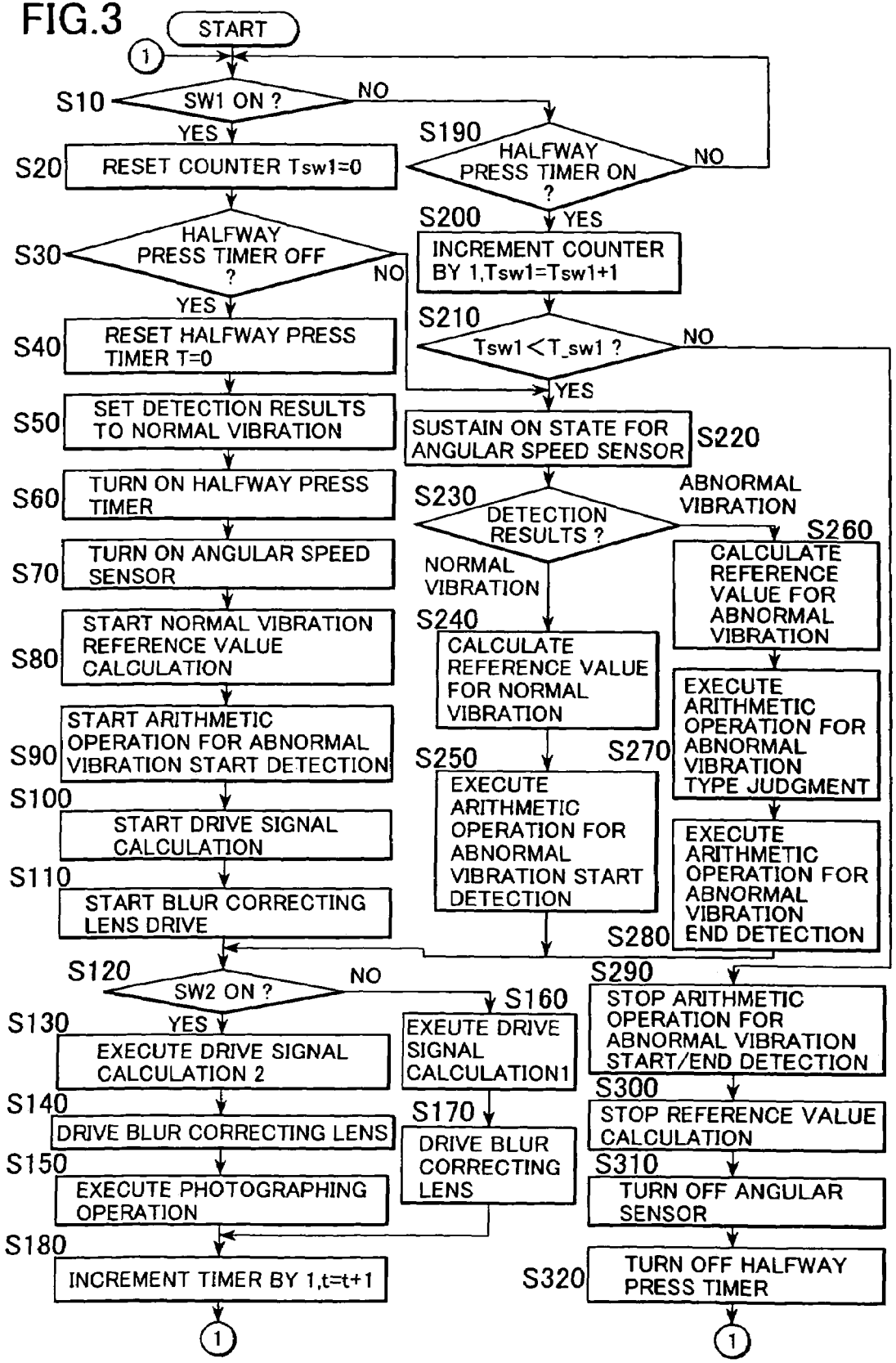
FIG. 3 presents a flowchart of the overall operation executed in a camera system internally provided with the vibration detection device according to the first embodiment.

FIG. 3 presents a flowchart of the overall operation executed in the camera system internally provided with the vibration detection device according to the embodiment.

In step (hereafter indicated as S) 10, a decision is made as to whether or not the halfway press switch SW 1 is in an on state. If it is decided that the switch SW 1 is in an on state, the operation proceeds to S20, whereas if SW 1 is determined to be in an off state, the operation proceeds to S190.

In S20, a counter Tsw1 is reset to clear the count value to 0 (Tsw1=0). The count value indicating the length of time elapsing after the halfway press switch SW 1 is turned off, which is measured at the counter Tsw1 is an integer. The count value at the counter Tsw1 remains 0 while the halfway press switch is in an on state, and the counter Tsw1 is engaged in operation only while the halfway press switch SW 1 is in an off state and the halfway press timer 100 is in an on state.

In S30, a decision is made as to whether or not the halfway press timer 100 is in an off state. The operation proceeds to S40 if the halfway press timer 100 is determined to be in an off state, whereas the operation proceeds to S220 if the halfway press timer 100 is determined to be in an on state.

In S40, a counter t is reset and its count value is cleared to 0 (t=0). The counter t measures the length of time over which the halfway press timer 100 remains in an on state. The counter t, which is an integral value counter, starts a count operation simultaneously as the halfway press timer 100 enters an on state and continues the count operation while the halfway press timer 100 remains in an on state.

In S50, the results of the detection executed by the abnormal vibration detection unit 40 are set to the normal vibration state.

In S60, the halfway press timer 100 is turned on.

In S70, the angular speed sensor 10 is turned on to start a vibration detection. In addition, a conversion operation by the A/D converter 30 is started.

In S80, in conformance to the normal vibration state setting selected in S50, the reference value calculation for the normal vibration state is started. In the embodiment, the reference value is calculated by using expression (1).

In S90, in conformance to the normal vibration state setting selected in S50, the abnormal vibration start detection unit 41 starts the arithmetic operation for detecting an abnormal vibration start.

In S100, the drive signal arithmetic operation unit 50 starts the drive signal calculation.

In S110, the drive unit 70 starts to drive the blur correcting lens 80 based upon the drive signal obtained from the drive signal arithmetic operation unit 50.

In S120, a decision is made as to whether or not the full press switch SW 2 is in an on state. The operation proceeds to S160 if the full press switch SW 2 is determined to be in an off state. If the full press switch SW 2 is determined to be in an on state, on the other hand, the operation proceeds to S130.

In S130, the drive signal is calculated in correspondence to the specific state of the vibration based upon the output from the angular speed sensor 10, the reference value, the results of the vibration state judgment and the state of the mode switch 160 (drive signal calculation 2).

In S140, the blur correcting lens 80 is driven by using the drive signal calculated in S130.

In S150, the series of photographing operations are executed to raise the mirror 130, open/close the shutter (not shown), lower the mirror 130 and drive the feed motor 150.

In S160, the drive signal is calculated in correspondence to the specific state of the vibration based upon the output from the angular speed sensor 10, the reference value, the results of the vibration state judgment and the state of the mode switch 160 (drive signal calculation 1).

It is to be noted that the drive signal calculation 1 and the drive signal calculation 2 executed in S160 and S130 respectively, in which the results of the calculation change because of the alteration made on the vibration detection signal by the vibration detection signal processing unit 53 of the drive signal arithmetic operation unit 50, as explained earlier, are to be detailed later, in reference to the flowcharts presented in FIGS. 4 and 5.

In S170, the blur correcting lens 80 is driven by using the drive signal calculated in S160.

In S180, the value at the counter t of the halfway press timer 100 is incremented by 1 (an arithmetic operation t=t+1 is executed).

In S190, a decision is made as to whether or not the halfway press timer 100 is in an on state. The operation proceeds to S200 if the halfway press timer 100 is determined to be in an on state, or the operation returns to S10 if the halfway press timer 100 is determined to be in an off state to continuously execute the detection at the halfway press switch SW 1.

In S200, to which the operation proceeds after the halfway press switch SW 1 is turned off and the halfway press timer 100 is turned on in the camera, the value at the counter Tsw1 is incremented by 1 (an arithmetic operation Tsw1=Tsw1+1 is executed) to measure the length of time over which the halfway press switch SW 1 sustains an off state and the halfway press timer 100 sustains an on state.

In S210, a decision is made as to whether or not the value at the counter Tsw1 is smaller than a threshold value T_SW1. The threshold value T_SW1 is a constant used to set the upper limit for the counter Tsw1, which determines the length of time to elapse before the halfway press timer 100 enters an off state after the halfway press switch SW 1 is turned off.

If the value at the counter Tsw1 is smaller than the threshold value, i.e., if an affirmative decision is made, the operation proceeds to S220 without turning off the halfway press timer 100. If, on the other hand, the value at the counter Tsw1 is equal to the threshold value, i.e., if a negative decision is made in step S210, the operation proceeds to S290 to execute processing for turning off the halfway press timer 100 (S 320) and processing which is necessitated when turning off the halfway press timer 100 (S 300 and S310).

In S220, the angular speed sensor 10 sustains an on state and continuously executes the vibration detection. In addition, the conversion operation by the A/D converter 30 is also continuously executed.

In S230, the results of the detection executed by the abnormal vibration detection unit 40 are monitored. The operation proceeds to S240 if the detection results indicate the normal vibration state, whereas the operation proceeds to S260 if the detection results indicate the abnormal vibration state.

In S240, the reference value calculation unit 52 calculates the reference value for the normal vibration state. In this embodiment, the reference value is calculated by using expression (1).

In S250, the abnormal vibration start detection unit 41 executes the arithmetic operation for detecting an abnormal vibration start. If an abnormal vibration start is detected in this step, the setting indicating the detection results is changed from the normal vibration state to the abnormal vibration state.

In S260, the reference value calculation unit 52 calculates a reference value for the abnormal vibration state. In the embodiment, the reference value is calculated by using expression (2).

In S270, the abnormal vibration type judging unit 42 executes the arithmetic operation for determining the type of the abnormal vibration.

In S280, the abnormal vibration end detection unit 43 executes the arithmetic operation for detecting an abnormal vibration end. If an abnormal vibration end is detected in this step, the setting indicating the detection results is changed from the abnormal vibration state to the normal vibration state.

In S290, the arithmetic operation for detecting an abnormal vibration start or an abnormal vibration end executed by the abnormal vibration start detection unit 41 or the abnormal vibration end detection unit 43 is stopped.

In S300, the arithmetic operation for calculating the reference value executed by the reference value calculation unit 52 is stopped.

In S310, the power supply to the angular speed sensor 10 is stopped to turn off the angular speed sensor.

In S320, the halfway press timer 100 is turned off and then the operation returns to S10 to detect the state of the halfway press switch SW 1.

Figure 4:
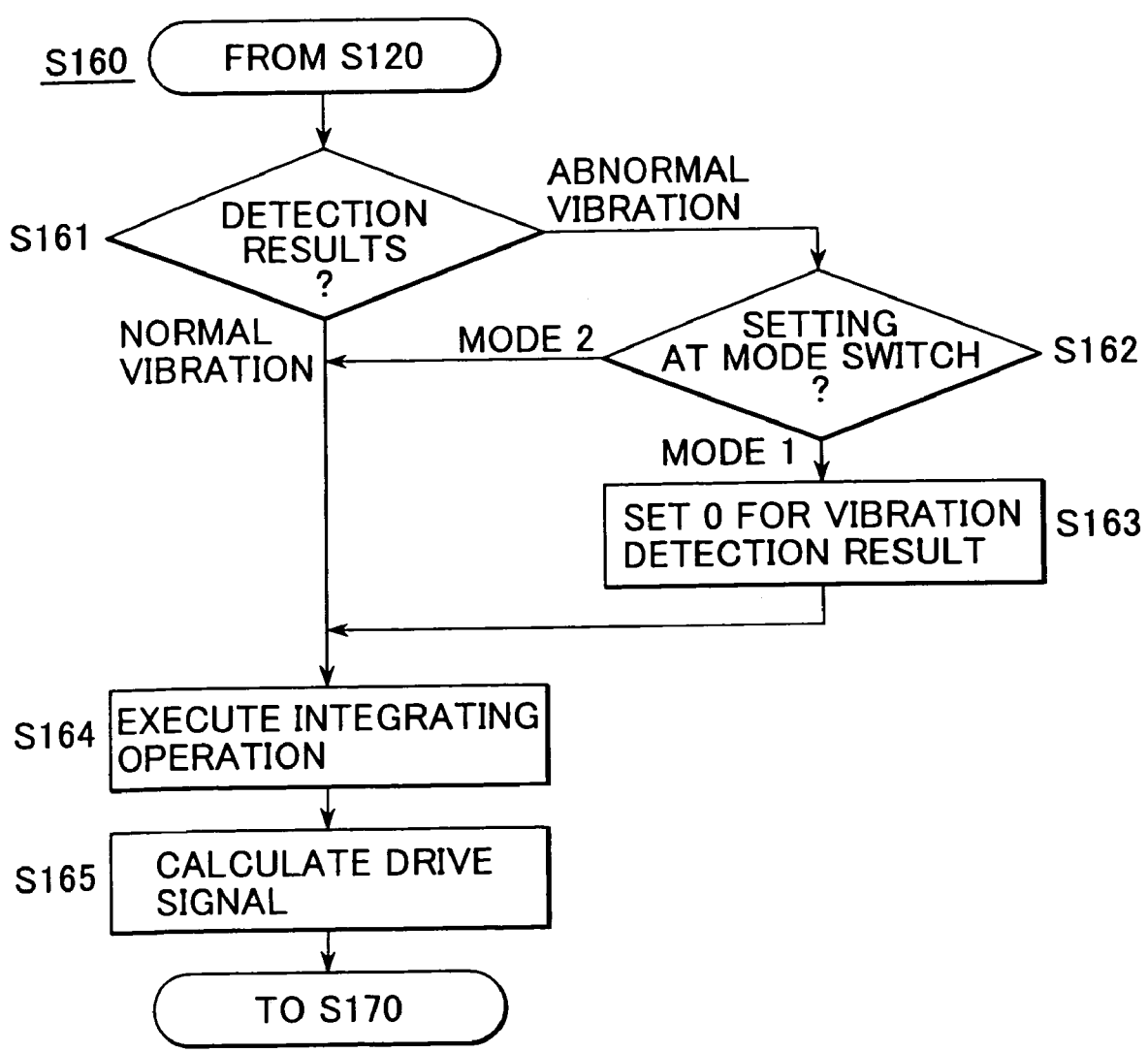

FIG. 4 presents a flowchart of the drive signal calculation 1 (S 160 in FIG. 3) executed when the halfway press switch is in an on state.

In S161, the results of the vibration state detection executed by the abnormal vibration detection unit 40 are monitored. If the results indicate the normal vibration state, the operation proceeds to S164, whereas if the results indicate the abnormal vibration state, the operation proceeds to S162.

In S162, the setting at the mode switch 160 is monitored. If the mode 1 is selected, the operation proceeds to S163, whereas if the mode 2 is selected, the operation proceeds to S164.

In S163, the vibration detection signal processing unit 53 sets the vibration detection signal to 0. Thus, the subsequent integration results are put on hold (fixed at a constant value) and the blur correcting lens 80 appears to stop.

In S164, the integrating operation unit 54 converts the vibration detection signal to angle information by integrating the vibration detection signal.

In S165, the drive signal calculation unit 58 calculates the drive signal for the blur correcting lens by incorporating the lens focal length information and the lens position information with the angle information.

Figure 5:
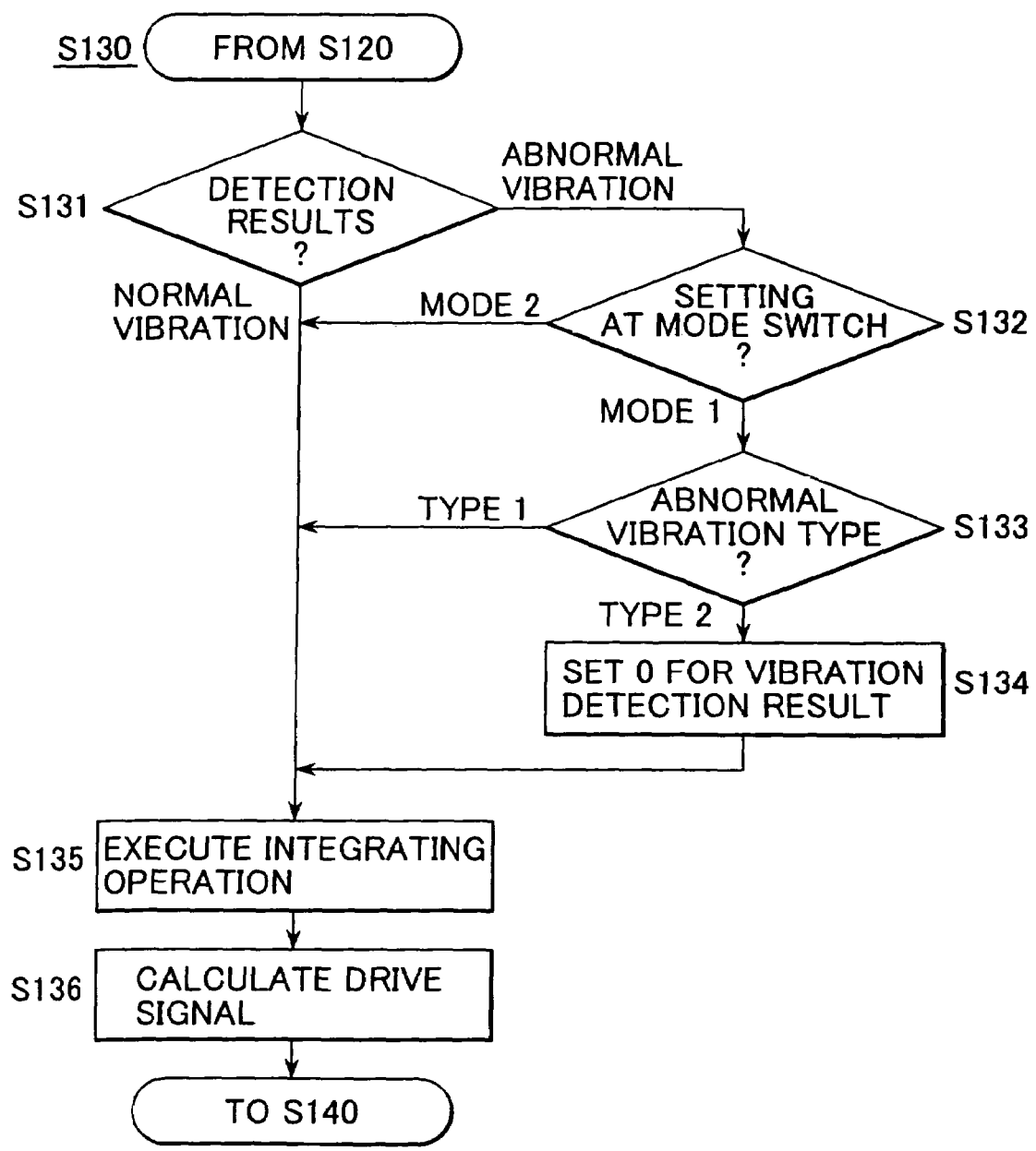

FIG. 5 presents a flowchart of the drive signal calculation 2 (S 130 in FIG. 3) executed when the full press switch is in an on state.

In S131, the results of the vibration state detection executed by the abnormal vibration detection unit 40 are monitored. If the results indicate the normal vibration state, the operation proceeds to S135, whereas if the results indicate the abnormal vibration state, the operation proceeds to S132.

In S132, the setting at the mode switch 160 is monitored. If the mode 1 is selected, the operation proceeds to S133, whereas if the mode 2 is selected, the operation proceeds to S135.

In S133, the results of the abnormal vibration type judgment executed by the abnormal vibration type judging unit 42 are monitored. The operation proceeds to S135 if the vibration is classified as type 1, whereas the operation proceeds to S134 if the vibration is classified as type 2.

In S134, the vibration detection signal processing unit 53 sets the vibration detection signal to 0. Thus, the subsequent integration results are put on hold (fixed at a constant value) and the blur correcting lens 80 appears to stop.

In S135, the integrating operation unit 54 converts the vibration detection signal to angle information by integrating the vibration detection signal.

In S136, the drive signal calculation unit 58 calculates the drive signal for the blur correcting lens by incorporating the lens focal length information and the lens position information with the angle information.

FIG. 6 presents a chart summarizing the drive signal calculation 1 and the drive signal calculation 2 selectively executed through the operations shown in the flowcharts presented in FIGS. 4 and 5.

If the intent of the photographer is even slightly indicated while the halfway press switch is in an on state in mode 1, the vibration correction is stopped. As a result, a setting suited for a normal camera operation, a panning photographing operation and a composition modification is selected.

If the mode 2 is selected while the halfway press switch is in an on state, the vibration correction is executed constantly and thus, the setting suited for a camera operation in an erratically moving vehicle moving is selected.

By selecting a different setting at the mode switch 160 in conformance to the specific operating condition, it becomes possible to ensure that the viewfinder image always appears natural and that the photographer does not experience any discomfort under any circumstances.

In addition, if an abnormal vibration is classified as type 1 during an exposure operation (while the full press switch is in an on state) in the mode 1, the vibration to which the camera is subjected includes a vibration not intended by the photographer and, thus, the unintended vibration is corrected to improve the photographing results.

If, on the other hand, an abnormal vibration is classified as type 2 during an exposure operation (while the full press switch is in an on state) in mode 1, the vibration to which the camera is subjected is predominantly constituted of a movement intended by the photographer and thus, the vibration correction is stopped, so as to prevent any adverse effect on the photographing results.

Furthermore, if the mode 2 is selected during an exposure operation (while the full press switch is in an on state), it is basically presumed that the vibration to which the camera is subjected is entirely attributable to a vibration not intended by the photographer and, accordingly, the vibration correction is executed constantly to improve the photographic results.

The embodiment, in which the abnormal vibration detection unit 40 classifies the state of each vibration and determines the vibration to be a specific type, enables a photographing operation to be performed in an optimal condition in any situation by combining the decision made by the abnormal vibration detection unit 40 with the setting selected at the mode switch 160.

In addition, since an ordinary photographer hardly ever takes pictures from a vehicle, mode 1 may be selected for the camera at all times. Since this setting allows the camera to operate appropriately in all likely situations and relieves the user from the trouble of having to frequently operate the mode switch 160, the user can utilize the vibration correcting system with ease and comfort.

The vibration correcting camera explained above achieves the following advantages.

Since the state of a given vibration is determined to be one of at least the following three states, i.e., the first abnormal vibration state, the second abnormal vibration state and the normal vibration state, optimal control can be implemented in correspondence to the specific state of the vibration.

Since a vibration is determined to indicate the first abnormal vibration state if it contains a vibration not intended by the photographer to a predetermined extent and the vibration is determined to indicate the second abnormal vibration state if it is predominantly constituted of a movement intended by the photographer, the control can be implemented by reflecting the intent of the photographer.

Since the control is implemented to switch the method of drive signal calculation in conformance to the setting at the mode switch, control reflecting the intent of the photographer is reliably achieved.

Since the control is implemented to switch the method of drive signal calculation in conformance to whether or not a photographing exposure operation is in progress, the vibration correcting operation can be executed without any discomfort experienced by the photographer while observing the image through the viewfinder.

Since the control is implemented to execute the drive signal calculation so as to perform the vibration correcting operation by driving the blur correcting optical system regardless of the setting at the mode switch or whether or not a photographing exposure operation is in progress if the state of the vibration is determined to be the normal vibration state, a reliable vibration correcting operation is achieved in the normal vibration state, which requires a vibration correction.

Since the first mode, in which the control of the drive signal arithmetic operation unit is automatically adjusted in conformance to the results of a decision made with regard to the state of the vibration or the second mode, in which the control is implemented on the drive signal arithmetic operation unit to execute the vibration correcting operation by driving the blur correcting optical system regardless of the results of the decision made with regard to the state of the vibration or whether or not a photographing exposure operation is in progress, can be selected at the mode switch, it is possible to perform an optimal operation without requiring the photographer to perform any extra operation under normal circumstances and to execute a reliable vibration correcting operation by reflecting the intent of the photographer whenever necessary.

Since the control is implemented so as not to execute the vibration correcting operation during a photographing exposure preparation but to execute the vibration correcting operation during a photographing exposure operation if the state of the vibration is classified as the first abnormal vibration state and the first mode is selected at the mode switch, an effective vibration correcting operation is achieved without any discomfort experienced by the photographer observing the image through the viewfinder or the like.

Since the control for executing the drive signal calculation is implemented so as not to perform any vibration correcting operation by stopping of the drive of the blur correcting optical system regardless of whether or not a photographing exposure operation is in progress if the state of the vibration is classified as the second abnormal vibration state and the first mode is selected at the mode switch, no correction is executed for an intentional photographing operation such as panning and the photographer can follow the subject with ease.

-Second Embodiment-

In the first embodiment, the mode switch 160 is provided to allow the photographer to choose the vibration correcting operation mode in conformance to the specific purpose for which the camera is being used (the photographing conditions). Accordingly, the drive signal calculation is executed in S130 and S160 in FIG. 3 by taking into consideration the setting at the mode switch 160. By contrast, in the second embodiment, in which the abnormal vibration type judging unit 42 engages in the operation detailed later, the mode switch 160 is not provided. Through the operation of the abnormal vibration type judging unit 42, an accurate and quick detection can be performed efficiently to ascertain whether the photographing operation being performed is a gentle panning photographing operation in which the vibration to which the camera is subjected is constituted of both a movement intended by the photographer and an unintended vibration or the photographing operation is a fast panning photographing operation in which the vibration is predominantly constituted of a movement intended by the photographer. As a result, the drive signal calculation can be executed with a higher degree of accuracy without having to provide the mode switch 160.

Figure 8:
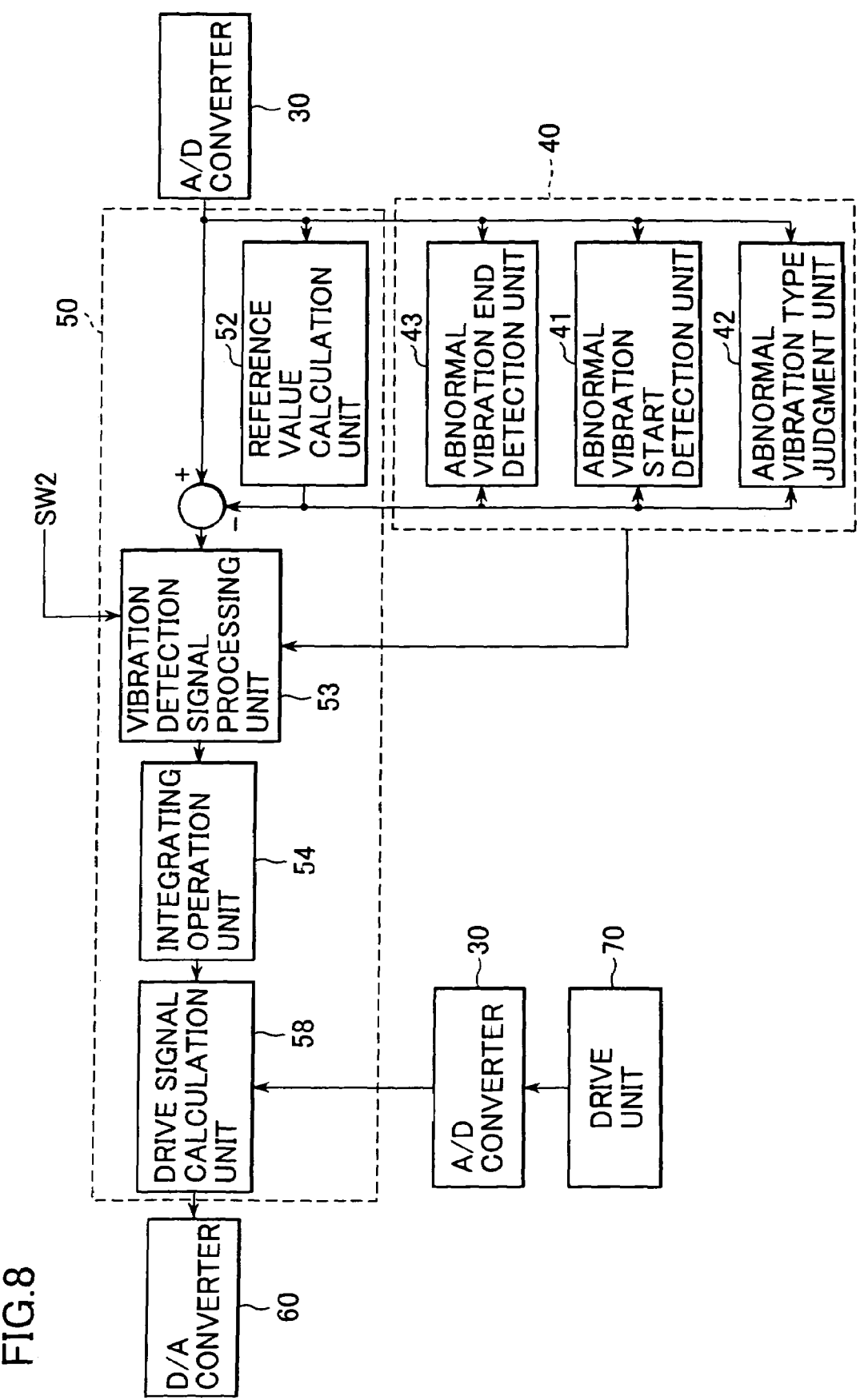
FIG. 8 shows the internal structures adopted in the drive signal calculation unit 50 and the abnormal vibration detection unit 40 in the second embodiment.

FIG. 7 is a block diagram schematically illustrating the vibration detection device and the vibration correcting optical device according to the second embodiment. FIG. 8 shows the internal structures adopted in the drive signal arithmetic operation unit 50 and the abnormal vibration detection unit 40 in the second embodiment. Since the flow of the overall operation executed in the camera system internally provided with the vibration detection device according to the second embodiment is similar to that shown in FIG. 3 illustrating the operation achieved in the first embodiment, FIG. 3 is used for reference in the explanation below.

FIGS. 7 and 8 differ from FIGS. 1 and 2 illustrating the first embodiment in that no mode switch 160 is provided. In addition, the operation of a specific component is different from its operation in the first embodiment, and the contents of a specific step in the flowchart presented in FIG. 3 are different from those in the first embodiment. The following explanation focuses on the differences from the first embodiment and the explanation of the first embodiment should be referred to for all the other details.

First, a panning photographing operation is explained. There are two different types of vibrations occurring along the panning direction during a panning photographing operation.

(1) A vibration of the camera being gently panned contains a vibration component corresponding to the vibration resulting from the intentional panning of the camera by the photographer and a component corresponding to a shaky hand movement which is not intended by the photographer.

(2) A vibration of the camera being swiftly panned is mostly constituted of the vibration component corresponding to the vibration resulting from the intentional panning of the camera by the photographer and contains very little unintended shaky hand movement component.

The vibration correcting optical device needs to correct an image blur attributable to the unintended shaky hand movement of the photographer. However, it is not desirable to execute the vibration correction for the movement intended by the photographer. According to the above-mentioned requirements, the two different types of vibration described above should be handled as described below.

(1) When a vibration occurs during a gentle panning photographing operation, no correction is made on the component corresponding to the vibration resulting from the intentional panning of the camera by the photographer but the vibration correction is executed for the component corresponding to the unintended shaky hand movement.

(2) No vibration correction is executed for a vibration of the camera during a swift panning photographing operation.

In addition, either of the specific measures described above should be adopted when, for instance, the photographer is taking a picture from a vehicle such as an automobile, as well as in a panning photographing operation. The type of a given vibration must be distinguished accurately and efficiently so as to execute the desired correcting operation accordingly.

Figure 9:
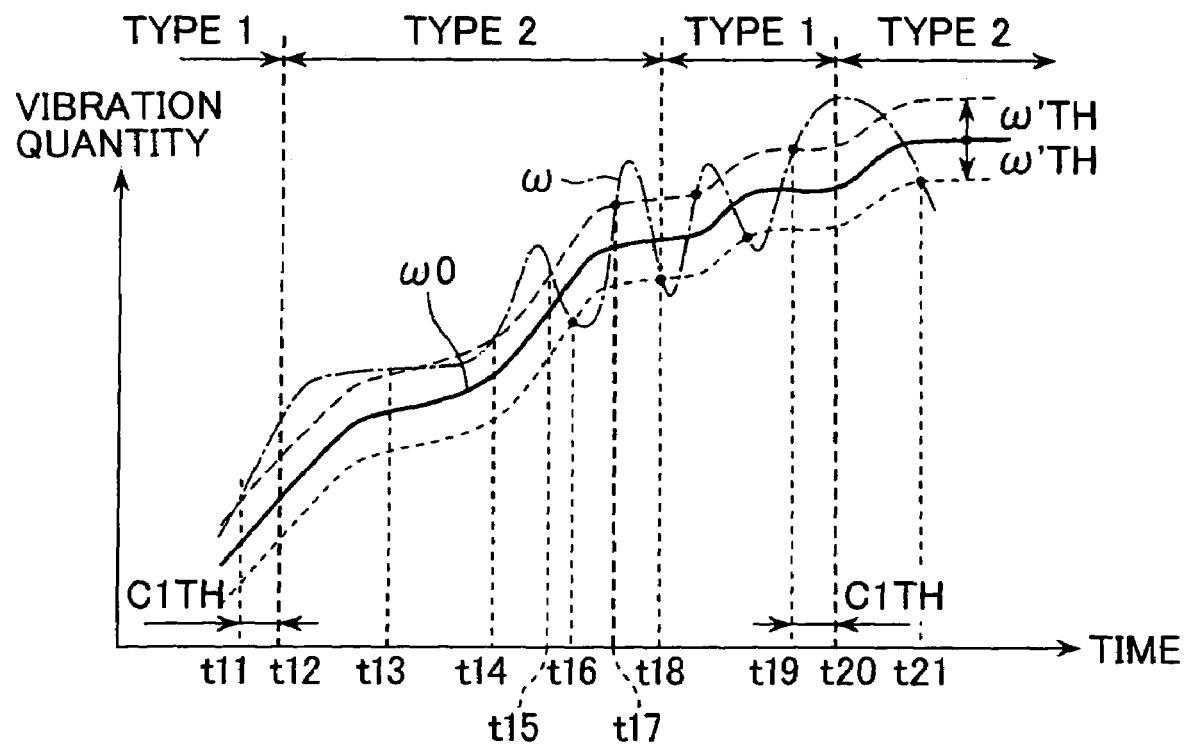
FIG. 9 illustrates the operation executed by the abnormal vibration type judging unit 42 in the second embodiment.

The operation of the abnormal vibration type judging unit 42 executed in the second embodiment is different from that in the first embodiment. FIG. 9 illustrates the operation of the abnormal vibration type judging unit 42 achieved in the second embodiment. FIG. 9 shows a hypothetical vibration manifesting along the axis representing the direction along which the camera is panned during a panning photographing operation.

First, the symbols appearing in FIG. 9 are defined as follows.

ω: sensor output signal
ω0: reference value
ω': vibration detection signal (=ω−ω0)
C1: type judging counter 1
C2: type judging counter 2
ω'TH: type judging threshold value 0 (ω'TH=0.5 degree/sec in the embodiment)
C1TH: type judging threshold value 1 (C1TH=200 ms in the embodiment)
C2TH: type judging threshold value 2 (C2TH=3 in the embodiment)

The value for ω'TH should be set to approximately ±0.4 through 0.6 degree/sec, which is half of the extent of an unsteady hand movement, i.e., ±0.8 through 1.2 degree/sec. If this value is set greater than the extent of the unsteady hand movement, the change in the sign cannot be detected even when a high frequency signal is input. If, on the other hand, the value is set too small, any change in the sign will be detected with an excessively high degree of sensitivity. In such a case, even a slight high frequency signal contained in the signal will be detected during a swift panning photographing operation to result in an unwanted correcting operation being executed.

In addition, it is desirable to set the value of C1TH to approximately is 1/7 through 1/3 sec since the frequency of an unintended hand movement is normally 3 through 7 Hz. If no signal is input (the sign is not reversed) after waiting in standby over this length of time, it can be assumed that the vibration to which the camera is subjected does not contain any unintentional vibration.

The abnormal vibration type judging unit 42 judges the type of a given vibration based upon the principle that the frequency of a vibration not intended by the photographer is high and the frequency of an intended movement is low. Basically, it performs the judgment by monitoring any changes occurring in the sign of the vibration detection signal ω'. This judgment is executed only while ω' satisfies |ω'|>ω' TH so as to achieve better efficiency in the calculation and improve the accuracy of the judgment. The operation of the abnormal vibration type judging unit 42 is outlined below.

(1) The judging operation is executed only when |ω'|>ω' TH, and as the status shifts to |ω'|=<ω' TH, the judgment results obtained at the time point of the status shift are held.

(2) Changes in the sign attached to ω' are monitored, and the vibration is determined to be type 2 if the sign does not changes very frequently, i.e., if the vibration detection signal is a low frequency signal, whereas the vibration is determined to be type 1 if sign changes frequently, i.e., if the vibration detection signal is a high frequency signal.

Next, the operation of the abnormal vibration type judging unit 42 is explained in reference to the specific example presented in FIG. 9. The explanation is given in sequence by referring to time points t11 through t21 set along the horizontal axis in FIG. 9. The explanation is provided on the assumption that at the time point t11, the vibration has already been determined to indicate the abnormal vibration state and it has already been classified as type 1 through the initialization to be detailed later. In the normal vibration state, ω remains within the ±ω' TH range over a predetermined length of time or longer. Once ω moves out of the ±ω' TH range, the vibration is judged to have entered the abnormal vibration state (an abnormal vibration has started), and the type classification explained above is executed after the initialization detailed later. When ω remains within the ±ω' TH range over the predetermined length of time or longer after making the judgment that the vibration has entered the abnormal vibration state, it is decided that the abnormal vibration state has ended.

At t11, |ω'|>ω' TH and, accordingly, a count operation is started at C1. The results of the judgment made at this time point indicate type 1.

At t12, C1=C1TH and, accordingly, the vibration is judged to be type 2. In addition, if a value other than 0 is indicated at C2, C2 is reset (C2=0) at this time point.

At t13, |ω'|=<ω' TH, and, accordingly, the count operation at C1 is stopped. However, C1 is not reset. Subsequently, no more judging operation is executed and the judgment results, i.e., type 2, are held until t14.

At t14, the status changes to |ω'|>ω' TH, and, accordingly, the sign of ω' is checked. In this example, the sign of ω' is positive. In addition, the sign of ω' during the period over which the status indicated |ω'|>ω' TH previously was also positive, and thus, since no change has occurred in the sign, C1 is not reset and is allowed to resume the count operation.

At t15, an operation similar to that executed at t13 is performed.

At t16, the status shifts to |ω'|>ω' TH and, accordingly, the sign of ω' is checked. In this example, the sign of ω' is negative. Since the sign of ω' during the period over which the status indicated |ω'|>ω' TH (t14 through t15) previously was positive, there has been a change in the sign. Accordingly, C1 is reset and then the count operation is resumed. At the same time, the value at C2 is incremented by 1. At this point in time, C2=1.

At t17, an operation similar to that executed at t16 is performed and, as a result, the value indicated at C2 becomes equal to 2.

At t18, an operation similar to those executed at t16 and at t17 is performed and, as a result, the value indicated at C2 becomes equal to 3. In the embodiment, C2TH is set to 3. As the value at C2 becomes equal to C2TH (=3) at t18, the type of the vibration is switched to type 1.

At t18 through t19, a process similar to that carried out at t16 through t17 is repeated and the vibration is continuously judged to be type 1.

At t19, the status shifts |ω'|>ω' TH and, accordingly, a count operation is started at C1. However, since the sign of ω' has changed, C1 is first reset before starting the count operation.

At t20, C1=C1TH and, accordingly, the vibration is judged to be type 2 as at t12. In addition, C2 is reset (C2=0) at this time point.

At t21, an operation similar to that executed at t16 is performed.

As described above, in the embodiment, if a low frequency signal is input, the signal is judged to indicate a movement intended by the photographer and, accordingly, the vibration is classified as type 2, as in t11 through t15. In addition, if a high frequency signal is input as at t16 through t19, the vibration is judged to be unintended by the photographer and is classified as type 1.

Figure 10:
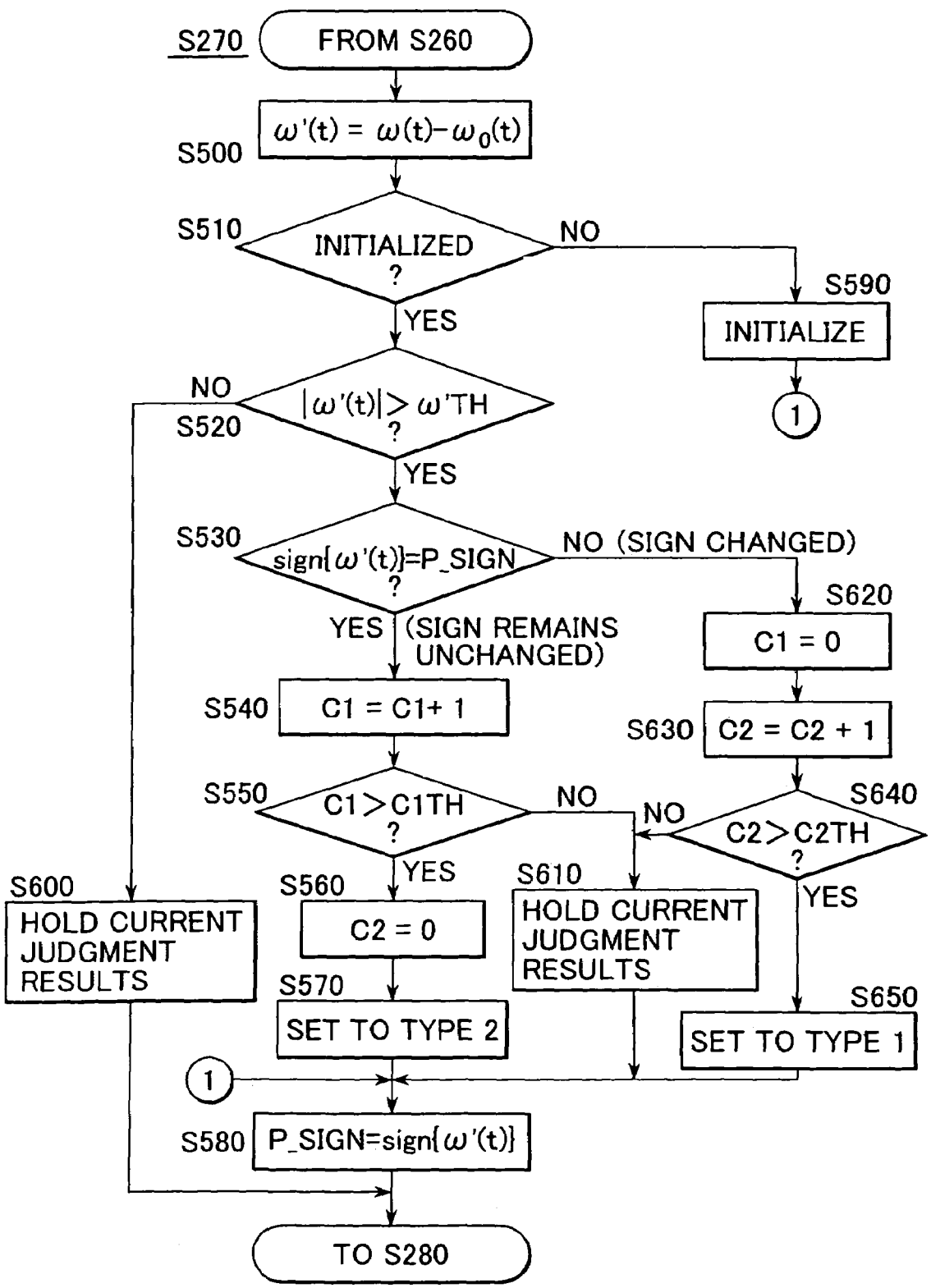
FIG. 10 presents a flowchart of the operation executed by the abnormal vibration type judging unit 42 in S270 in FIG. 3.
Figure 11:
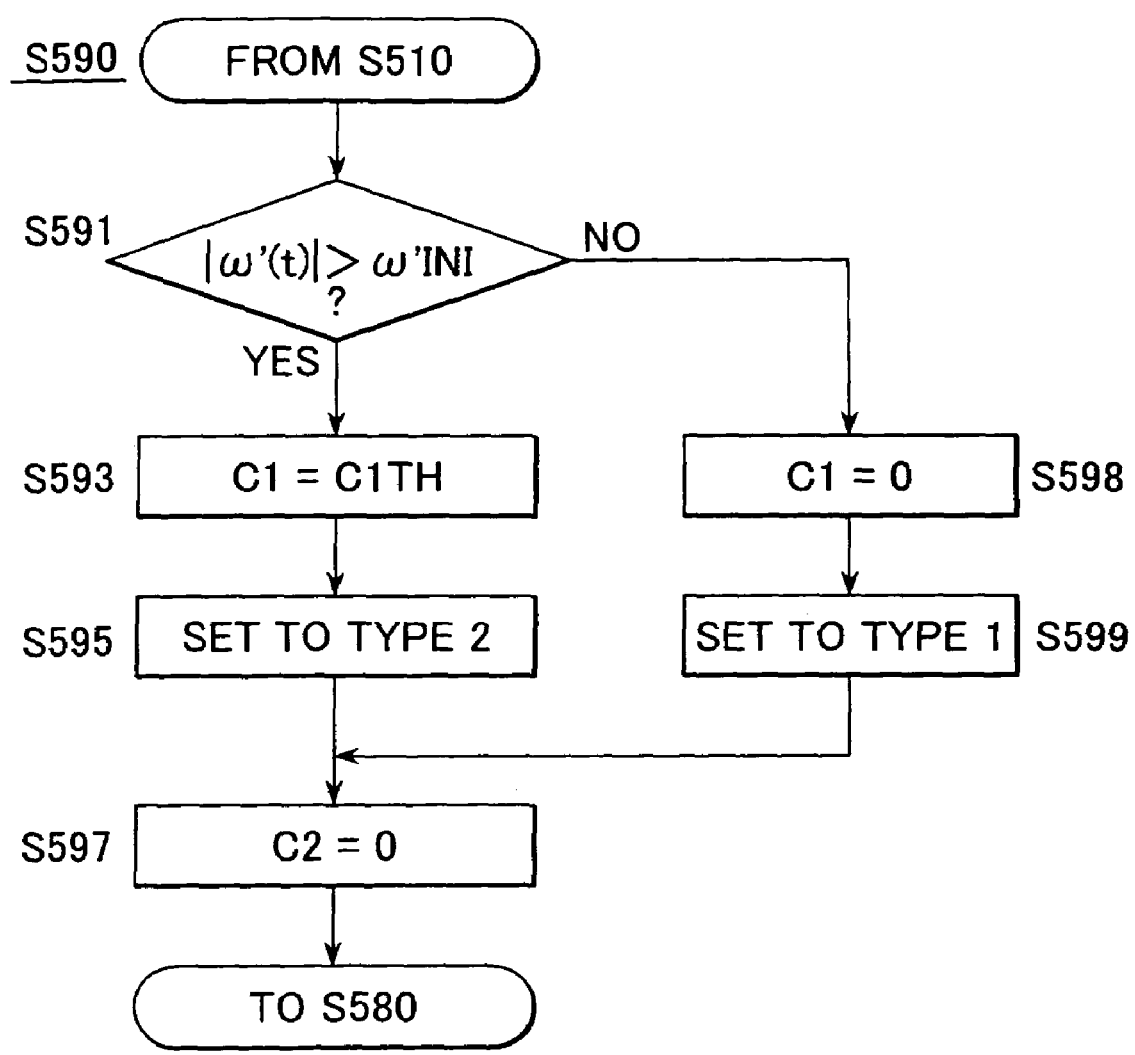
FIG. 11 presents a flowchart of the initialization operation executed by the abnormal vibration type judging unit 42 in S590 in FIG. 10.

Next, the flow of the operation executed at the abnormal vibration type judging unit 42 is explained in reference to the flowchart presented in FIGS. 10 and 11. FIG. 10 presents a flowchart of the operation executed at the abnormal vibration type judging unit 42 in S270 in FIG. 3. Namely, the operation executed in S270 in the second embodiment is different from the operation executed in S270 in the first embodiment.

In S500, the vibration detection signal ω' is obtained through an arithmetic operation executed by using expression (4) presented below.

$$\omega'(t) = w(t) - \omega 0(t) \quad \text{expression (4)}$$

In S510, a decision is made as to whether or not the abnormal vibration type judging unit 42 has been initialized. If the initialization has been completed, the operation proceeds to S520, whereas if the initialization has not been completed yet, the operation proceeds to S590 to execute the initialization.

In S520, a decision is made as to whether or not the absolute value of ω' is greater than ω' TH. The operation proceeds to S530 if the absolute value is determined to be greater, whereas the operation proceeds to S600 if the absolute value is determined to be smaller.

In S530, a decision is made as to whether or not there has been a change in the sign of ω'. Sign{ } in FIG. 10 represents an arithmetic operator that indicates the sign attached to the value within the brackets. In addition, P_SIGN indicates the sign attached to ω' previously. If there has been no change in the sign, the operation proceeds to S540, whereas if there has been a change, the operation proceeds to S620. In S540, the value at C1 is incremented by 1 (C1=C1+1).

In S550, a decision is made as to whether or not the value at C1 is greater than C1TH. The operation proceeds to S560 if the value at C1 is greater, whereas the operation proceeds S610 if the value at C1 is smaller.

In S560, C2 is reset (C2=0).

In S570, the judgment results are set to type 2. It is to be noted that if type 2 has already been set, the judgment setting is held as is.

In S580, the sign of ω' is stored at P_SIGN.

In S590, the abnormal vibration type judging unit 42 is initialized. This initialization operation is executed when the abnormal vibration start detection unit detects an abnormal vibration start. The initialization operation is to be explained in detail in reference to FIG. 11. Once the initialization is completed, the operation proceeds to S580.

In S600, the current judgment results are held and the operation proceeds to S280. In S610, the current judgment is held and then the operation proceeds to S580. In S620, C1 is reset (C1=0). In S630, the value at C2 is incremented by 1 (C2=C2+1). In S640, a decision is made as to whether or not the value indicated at C2 is greater than C2TH. The operation proceeds to S650 if the value at C2 is greater, whereas the operation proceeds to S610 if the value at C2 is smaller. In S650, the judgment results are set to type 1. If type 1 has already been set, the judgment setting is held as is.

Since the judging operation is not executed unless a specific condition is satisfied (S 520) as described above, the arithmetic operation load can be reduced.

FIG. 11 presents a flowchart of the initialization operation executed at the abnormal vibration type judging unit 42 in S590 in FIG. 10.

In S591, a decision is made as to whether or not the absolute value of ω' is greater than ω' INI. If the absolute value is greater, the operation proceeds to S593, whereas if the absolute value is smaller, the operation proceeds to S598.

In S593, the value at C1 is set to C1TH (C1=C1TH).

In S595, the judgment results are set to type 2.

In S597, C2 is reset (C2=0).

In S598, C1 is reset (C1=0).

In S599, the judgment results are set to type 2.

In this initialization routine, the results of the judgment made with regard to the vibration type are initialized depending upon the level of the vibration detection signal ω' generated when an abnormal vibration start is detected. In other words, the results of the judgment made on the abnormal vibration type are initialized based upon the principle that the value of ω' is large when an abnormal vibration start is detected during a swift panning photographing operation and the value of ω' is small when an abnormal vibration start is detected during a gentle panning photographing operation.

As described above, if the vibration to which the camera is subjected contains a vibration not intended by the photographer even during a panning photographing operation, the unintended vibration is promptly detected (the vibration is judged to be type 1) through this method. In addition, when the vibration is predominantly constituted of a movement intended by the photographer, too, the type of the vibration can be promptly detected (the vibration is judged to be type 2).

Through the operation of the abnormal vibration type judging unit 42 described above, an accurate and speedy detection can be performed to ascertain whether the camera is being used in a gentle panning photographing operation in which the camera is subjected to a vibration containing both a movement intended by the photographer and a vibration not intended by the photographer or the camera is being used in a swift panning photographing operation, in which the vibration of the camera is predominantly constituted of a movement intended by the photographer.

In addition, a speedy judgment can be made to determine the vibration type by using a high frequency signal with a large amplitude generated, for instance, when the camera is being used in a vehicle (the vibration is classified as type 1 in this case).

Furthermore, by using the sensor output signal ω and the reference value ω0, the accuracy with which a vibration is judged to be either type 1 or type 2 is improved in the embodiment. This feature is explained below.

During a swift panning photographing operation, the inclination angle of ω relative to the time axis is very large.

For this reason, the delay of ω0 relative to ω becomes significant and, as a result, the value ω' (=ω−ω0) increases as well. Thus, an instance in which |ω'|>ω' TH and the sign of ω' remains unchanged manifests more readily, which facilitates the detection of the swift panning photographing operation, i.e., the classification of the vibration as type 2.

During a gentle panning photographing operation, on the other hand, the inclination angle of ω relative to the time axis is small. For this reason, the delay of ω0 relative to ω becomes less significant and, as a result, the value of ω' decreases as well. Thus, an instance in which |ω'|>ω' TH and the sign of ω' changes is likely to manifest more readily, which facilitates the detection of the gentle panning photographing operation, i.e., the classification of the vibration as type 1.

The embodiment makes it possible to accurately and promptly distinguish a movement intended by the photographer from an unintended vibration. As a result, the vibration correcting operation can be executed as appropriate in correspondence to specific conditions and appropriate measures are adopted automatically under all circumstances.

In addition, since the operation to judge the vibration type is not executed unless the specific condition is satisfied, the arithmetic operation load can be reduced.

Furthermore, through the use of the sensor output signal ω and the reference value ω0, the accuracy with which a vibration is judged to be type 1 or a type 2 is improved.

The operations executed in S130 and S160 in FIG. 3 in the second embodiment are different from those executed in S130 and S160 in the first embodiment. More specifically, in the second embodiment the operation proceeds to S163 by skipping the mode judgment in S162 in FIG. 4 and the operation proceeds to S133 by skipping the mode judgment in S132 in FIG. 5.

It is to be noted that the abnormal vibration described above occurs as the camera is intentionally moved, e.g., during a panning photographing operation or when the photographer is taking pictures from a vehicle. Thus, the detection of an abnormal vibration start is equivalent to a detection of a camera movement start and the detection of an abnormal vibration end is equivalent to a detection of a camera movement end.

While the mode switch 160 is not included in the second embodiment, the mode switch 160 may be provided in the second embodiment as in the first embodiment. Namely, the second embodiment may be achieved by incorporating the first embodiment. In other words, the abnormal vibration type judging unit 42 in the first embodiment may engage in an operation identical to that of the abnormal vibration type judging unit 42 in the second embodiment.

The vibration correcting camera according to the second embodiment as described above realizes the following advantages.

If the predetermined condition with respect to the vibration detection signal and the reference value is satisfied, the state of the camera movement is judged by using the vibration detection signal and the reference value, whereas if the vibration detection signal and the reference value do not satisfy the predetermined condition, the state of the camera movement is judged without using either the vibration detection signal or the reference value. As a result, the judgment processing is only executed when necessary to lessen the processing load.

Since the judgment on the state of the camera movement is executed by using the vibration detection signal and the reference value if the value representing the difference between the vibration detection signal and the reference value is outside the predetermined range and the judgment on the state of the camera movement is executed without using either the vibration detection signal or the reference value if the difference indicates a value within the predetermined range, only a simple arithmetic operation needs to be executed and the processing load is lessened.

Since the state of the apparatus movement is judged to be either a first state of movement, which contains a vibration not intended by the user of the apparatus to a predetermined extent, or a second state of movement, which contains a movement intended by the user to a predetermined extant and either state is indicated in the movement state judgment results to be output, optimal processing best suited for the specific state of movement can be subsequently executed.

When the state of the apparatus movement is judged by using the vibration detection signal and the reference value, the sign attached to the value representing the difference between the vibration detection signal and the reference value is monitored, and the movement state judgment results are judged to indicate the second state of movement if the sign remains unchanged over a predetermined length of time or longer. In addition, if the sign of the value representing the difference between the vibration detection signal and the reference value used in the judgment of the movement state changes a predetermined number of times or more, the movement state judgment results are determined to indicate the first state of movement. As a result, an accurate judgment can be made with regard to the state of movement of the apparatus.

When the movement start detection unit detects a movement start, the results of the movement state judgment are initialized to the first state of movement if the absolute value of the difference between the vibration detection signal and the reference value is smaller than a predetermined value whereas the results of the movement state judgment are initialized to the second state of movement if the absolute value of the difference is greater than the predetermined value. Thus, the initial state can be determined with a high degree of accuracy.

While the present invention is adopted in a vibration correcting camera which uses silver halide film in the embodiments described above, the present invention is not limited to this kind of camera. For instance, the present invention may be adopted in a so-called digital camera that electrically records an image via a CCD or the like, or other optical device such as a video camera or binoculars. It may also be adopted in a portable telephone mounted with a camera.

The above described embodiments are examples, and various modifications can be made without departing from the spirit and scope of the invention.

What is claimed is:

1. A vibration correcting optical device, comprising:
  a vibration detection unit that detects a vibration of the vibration correcting optical device and outputs a vibration detection signal corresponding to the vibration;
  a vibration state judgment unit that judges a state of the vibration of the vibration correcting optical device to be one of at least three states, based upon the vibration detection signal;
  an image vibration correcting optical system that corrects an image vibration caused by the vibration of the vibration correcting optical device;
  a drive unit that drives the image vibration correcting optical system based upon a drive signal;

a drive signal arithmetic operation unit that calculates the drive signal based upon the vibration detection signal and outputs the drive signal to the drive unit;

a drive signal calculation control unit that controls a method for calculating the drive signal adopted at the drive signal arithmetic operation unit in conformance to the state of the vibration ascertained through a judgment executed by the vibration state judgment unit; and a mode switch for selectively switching to at least one of a first mode and a second mode of control to be implemented by the drive signal calculation control unit, wherein:

in the first mode, the control implemented by the drive signal calculation control unit is automatically switched based on the state ascertained by the vibration state judgment unit, and in the second mode, the control implemented by the drive signal calculation control unit enables the image vibration correcting optical system to correct image vibration independent of the state ascertained by the vibration state judgment unit.

2. A vibration correcting optical device according to claim 1, further comprising:

a reference value calculation unit that obtains through an arithmetic operation a reference value to be used as a reference in processing the vibration detection signal based upon the vibration detection signal, wherein:

the vibration state judgment unit judges the state of the vibration of the vibration correcting optical device based upon the vibration detection signal and the reference value; and the drive signal arithmetic operation unit calculates the drive signal based upon the vibration detection signal and the reference value.

3. A vibration correcting optical device according to claim 1, wherein:

the drive signal arithmetic operation unit comprises a low pass filter having a cutoff frequency through which the vibration detection signal passes; and the drive signal calculation control unit sets the cutoff frequency according to the state judged by the vibration state judgment unit.

4. A vibration correcting optical device according to claim 3, wherein:

the vibration state judgment unit judges the state of the vibration to be one of a normal vibration state, a first abnormal vibration state and a second abnormal vibration state; and the drive signal calculation control unit sets the cutoff frequency in the normal vibration state lower than at least one of the cutoff frequency in the first abnormal vibration state and the cutoff frequency in the second abnormal vibration state.

5. A vibration correcting optical device, comprising:

a vibration detection unit that detects a vibration of the vibration correcting optical device and outputs a vibration detection signal corresponding to the vibration;

a vibration state judgment unit that judges a state of the vibration of the vibration correcting optical device;

an image vibration correcting optical system that corrects an image vibration caused by the vibration of the vibration correcting optical device;

a drive unit that drives the image vibration correcting optical system based upon a drive signal;

a drive signal arithmetic operation unit that calculates the drive signal based upon the vibration detection signal and outputs the drive signal to the drive unit;

a drive signal calculation control unit that controls a method for calculating the drive signal adopted at the drive signal arithmetic operation unit in conformance to the state of the vibration ascertained through a judgment executed by the vibration state judgment unit; and a reference value calculation unit that obtains through an arithmetic operation a reference value to be used as a reference in processing the vibration detection signal based upon the vibration detection signal, wherein:

the drive signal calculation control unit sets a number of sets of sampling data of the vibration detection signal according to the state judged by the vibration state judgment unit.

6. A vibration correcting optical device according to claim 5, wherein:

the vibration state judgment unit judges the state of the vibration to be one of a normal vibration state and an abnormal vibration state; and the drive signal calculation control unit sets the number of sets of sampling data of the vibration detection signal in the normal vibration state larger than the number of sets of sampling data of the vibration detection signal in the abnormal vibration state.

7. A vibration correcting method by using a vibration corrector, the method comprising:

detecting a vibration with a vibration detection sensor;

judging a state of the detected vibration to be one of at least three states based upon the detected vibration, the at least three states including a normal vibration state that does not contain a vibration intended by a photographer, a first abnormal vibration state that contains a vibration intended by the photographer to a predetermined extent and a second abnormal vibration state that contains a vibration intended by the photographer to an extent more than the first abnormal vibration state; and prohibiting an operation of the vibration corrector when the detected vibration is judged to be the second abnormal vibration state.

8. A vibration correcting method according to claim 7, wherein the vibration intended by the photographer is caused by a panning photographing operation by the photographer.

9. A vibration correcting method according to claim 7, wherein:

the state of the detected vibration is judged to be the first abnormal vibration state when a signal output from the vibration detection sensor contains a high frequency component with a frequency lower than a predetermined value; and the state of the detected vibration is judged to be the second abnormal vibration state when a signal output from the vibration detection sensor contains a high frequency component with a frequency equal to or higher than the predetermined value.

10. A vibration correcting method comprising:

detecting a vibration with a vibration detection sensor;

judging a state of the detected vibration to be one of at least three states based upon the detected vibration, the at least three states including a normal vibration state that does not contain a vibration intended by a photographer, a first abnormal vibration state that contains a vibration intended by the photographer to a predetermined extent and a second abnormal vibration state that contains a vibration intended by the photographer to an extent more than the first abnormal vibration state;

judging a state of an operation switch that can be operated by a photographer; and correcting an image vibration caused by the vibration based upon one of the at least three states and the state of the operation switch, wherein the image vibration is corrected regardless of a judging result of the three states when the operation switch is set to designate an unsteady state.

11. A vibration correcting method according to claim 10, wherein the operation switch is a switch to be set to designate whether the photographer is in a steady state or in the unsteady state.

12. A vibration correcting method according to claim 10, wherein the unsteady state is a state that the photographer is riding in a vehicle.

13. A vibration correcting method according to claim 10, wherein the image vibration is corrected based upon one of the at least three states when the operation switch is set to designate a steady state.

* * * * *